United States Patent
Kitching et al.

(10) Patent No.: US 11,940,276 B2
(45) Date of Patent: Mar. 26, 2024

(54) INERTIAL POINT-SOURCE MATTER-WAVE ATOM INTERFEROMETER GYROSCOPE AND EXTRACTING INERTIAL PARAMETERS

(71) Applicant: Government of the United States of America, as represented by the Secretary of Commerce, Gaithersburg, MD (US)

(72) Inventors: John Edward Kitching, Boulder, CO (US); Elizabeth Ann Donley, Boulder, CO (US); Azure Lynn Hansen, Louisville, CO (US); Yun-Jhih Chen, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 501 days.

(21) Appl. No.: 17/177,895

(22) Filed: Feb. 17, 2021

(65) Prior Publication Data
US 2021/0262798 A1    Aug. 26, 2021

Related U.S. Application Data

(60) Provisional application No. 62/979,003, filed on Feb. 20, 2020.

(51) Int. Cl.
| | |
|---|---|
| *G01C 19/62* | (2006.01) |
| *G01B 9/02015* | (2022.01) |
| *G01P 15/093* | (2006.01) |
| *G21K 1/06* | (2006.01) |
| *G21K 1/12* | (2006.01) |
| *G01C 19/64* | (2006.01) |

(52) U.S. Cl.
CPC .......... *G01C 19/62* (2013.01); *G01B 9/0203* (2013.01); *G01P 15/093* (2013.01); *G21K 1/067* (2013.01); *G21K 1/12* (2013.01); *G01C 19/64* (2013.01)

(58) Field of Classification Search
None
See application file for complete search history.

(56) References Cited

U.S. PATENT DOCUMENTS

| | | | | |
|---|---|---|---|---|
| 11,150,093 | B1* | 10/2021 | Kasevich | ............... G01V 7/04 |
| 2014/0375998 | A1* | 12/2014 | Kasevich | ........... G01B 9/02001 356/450 |
| 2022/0236060 | A1* | 7/2022 | Anderson | .............. G01C 19/58 |

OTHER PUBLICATIONS

Chen, et al., "Multi-axis atom interferometer gyroscope with a single source of atoms", arXiv: 1812.00106 [physics.atom-ph], Dec. 1, 2018 (Year: 2018).*

(Continued)

*Primary Examiner* — Rodney E Fuller
(74) *Attorney, Agent, or Firm* — Office of Chief Counsel for National Institute of Standards and Technology

(57) ABSTRACT

An inertial point-source matter-wave atom interferometer gyroscope includes an analyzer that receives fringe images of gyroscope atoms and includes: a first fringe image that includes a first fringe phase, a second fringe image that includes a second fringe phase; and a third fringe image that includes a third fringe phase, wherein the first fringe phase, the second fringe phase, and the third fringe phase are different; a phase mapper of the analyzer that produces a interferometric phase map for the gyroscope atoms from the fringe images of the gyroscope atoms; and a fitter of the analyzer in communication with the phase mapper and that receives the interferometric phase map from the analyzer and determines inertial parameters of the gyroscope atoms from the interferometric phase map, the inertial parameters (Continued)

including an acceleration and a rotation rate of the inertial point-source matter-wave atom interferometer gyroscope relative to the gyroscope atoms.

27 Claims, 14 Drawing Sheets

(56) References Cited

OTHER PUBLICATIONS

Schreiber, H., et al., "Phase shifting interferometry", Optical Shop Testing, 2007, p. 1-862, 3rd edn. John Wiley & Sons.
De Groot, P., "Phase shifting interferometry", Optical Measurement of Surface Topography, 2011, p. 167-186, Springer-Verlag.
Bruning, J.H., et al., "Digital Wavefront Measuring Interferometer for Testing Optical Surfaces and Lenses", Applied Optics, 1974, p. 2693-2703, vol. 13 No. 11.
Chen, Y-J., et al., "Single-Source Multiaxis Cold-Atom Interferometer in a Centimeter-Scale Cell", Physical Review Applied, 2019, p. 014019, vol. 12.
Dickerson, S.M., et al., "Multiaxis Inertial Sensing with Long-Time Point Source Atom Interferometry", Physical Review Letters, 2013, p. 083001, vol. 111.
Segal, S.R., et al., "Revealing buried information: Statistical processing techniques for ultracold-gas image analysis", Physical Review A, 2010, p. 053601, vol. 81.
Sugarbaker, A., et al., "Enhanced Atom Interferometer Readout through the Application of Phase Shear", Physical Review Letters, 2013, p. 113002, vol. 111.

\* cited by examiner fringe image 1    fringe image 2

$\beta$      $\beta + \pi/2$ fringe image 3    fringe image 4

$\beta + \pi$      $\beta + 3\pi/2$ phase map

SHEEP →

INERTIAL POINT-SOURCE MATTER-WAVE ATOM INTERFEROMETER GYROSCOPE AND EXTRACTING INERTIAL PARAMETERS

CROSS REFERENCE TO RELATED APPLICATIONS

The application claims priority to U.S. Provisional Patent Application Ser. No. 62/979,003, filed Feb. 20, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 975-2573; email tpo@nist.gov; reference NIST Docket Number 20-026US1.

BRIEF DESCRIPTION

Disclosed is a process for extracting inertial parameters, the process comprising: subjecting gyroscope atoms in an expanding cold atom cloud formed from a point-source of the gyroscope atoms to modulated light and imprinting a laser phase of the modulated light onto the gyroscope atoms; producing matter-wave interference among gyroscope atoms in an expanding cold atom cloud formed from a point-source of the gyroscope atoms in response to subjecting the gyroscope atoms in the expanding cold atom cloud to the modulated light; subjecting the gyroscope atoms in the expanding cold atom cloud to imaging light; acquiring a plurality of fringe images of the expanding cold atom cloud in response to subjecting the gyroscope atoms in the expanding cold atom cloud to the imaging light, such that for the plurality of fringe images a subsequent fringe image differs from an immediate prior fringe image by a difference in fringe phase; producing the difference in fringe phase by changing the laser phase of the modulated light between acquiring individual fringe images; converting the fringe images into an interferometric phase map; fitting a linear function of a first rotation phase, a second rotation phase, an acceleration phase, and the laser phase to the interferometric phase map to obtain the first rotation phase, the second rotation phase, and the acceleration phase; and converting the first rotation phase, the second rotation phase, and the acceleration phase from the fitting of the linear function to the interferometric phase map into a rotation rate and an acceleration of an inertial point-source matter-wave atom interferometer gyroscope in which the gyroscope atoms are disposed to extract inertial parameters comprising the rotation rate and the acceleration.

Disclosed is an inertial point-source matter-wave atom interferometer gyroscope comprising: an analyzer that receives a plurality of fringe images of gyroscope atoms, the fringe images comprising: a first fringe image that comprises a first fringe phase, a second fringe image that comprises a second fringe phase; and a third fringe image that comprises a third fringe phase, wherein the first fringe phase, the second fringe phase, and the third fringe phase are different; a phase mapper of the analyzer that produces a interferometric phase map for the gyroscope atoms from the fringe images of the gyroscope atoms; and a fitter of the analyzer in communication with the phase mapper and that receives the interferometric phase map from the analyzer and determines inertial parameters of the gyroscope atoms from the interferometric phase map, the inertial parameters comprising an acceleration and a rotation rate of the inertial point-source matter-wave atom interferometer gyroscope relative to the gyroscope atoms.

BRIEF DESCRIPTION OF THE DRAWINGS

The following description cannot be considered limiting in any way. With reference to the accompanying drawings, like elements are numbered alike.

DETAILED DESCRIPTION

Figure 1:
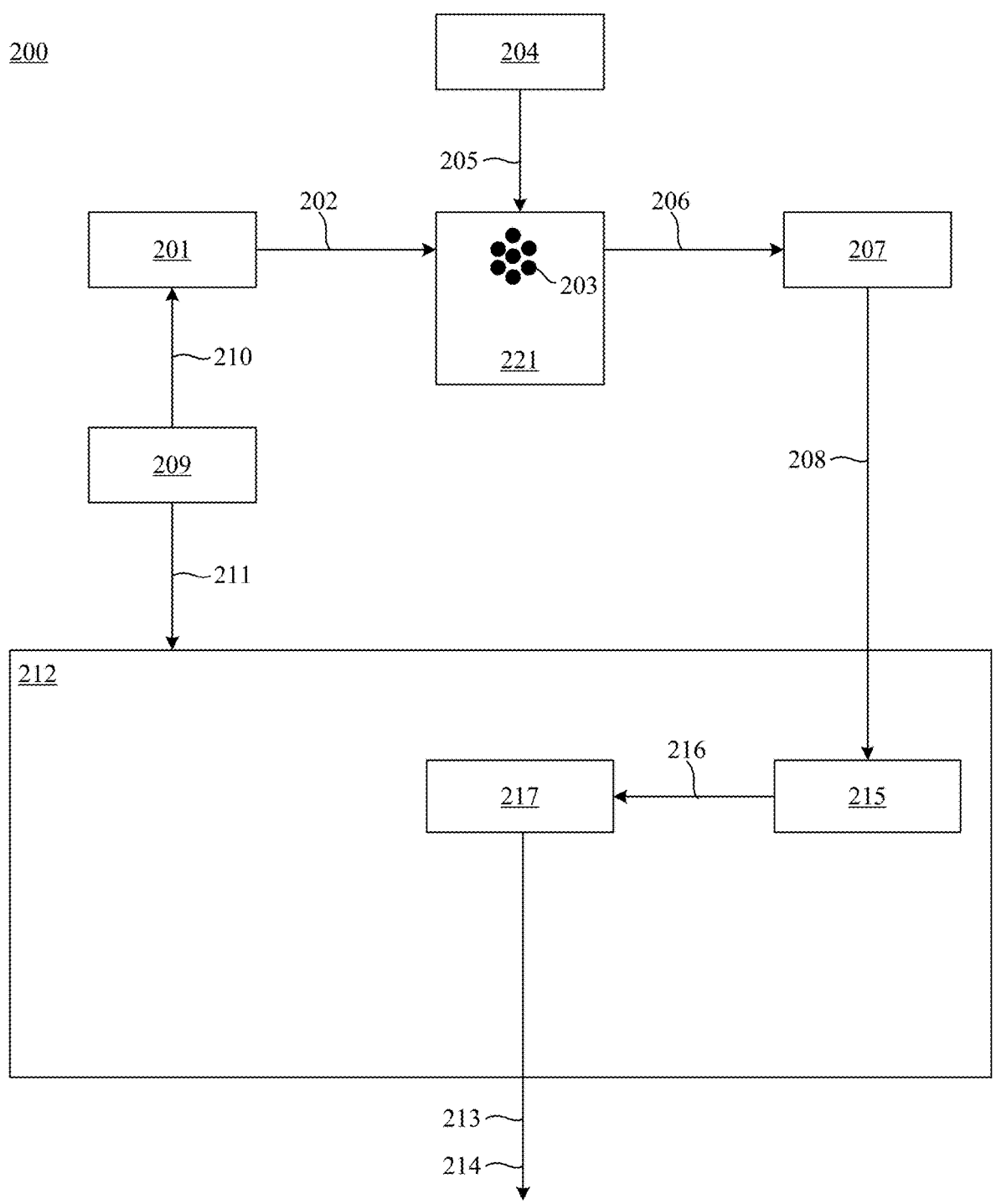
FIG. 1 shows an inertial point-source matter-wave atom interferometer gyroscope.
Figure 2:
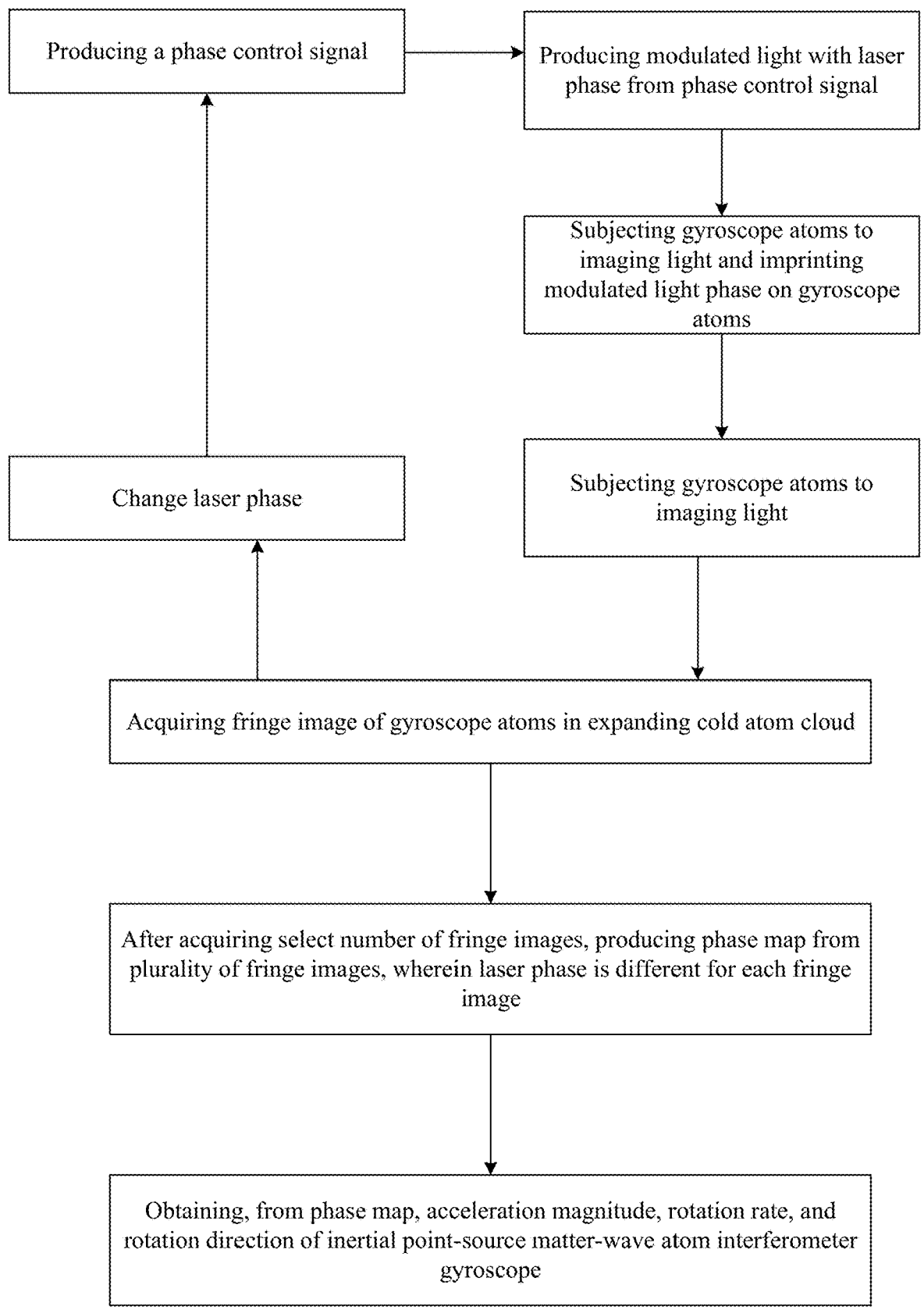
FIG. 2 shows extraction of inertial parameters from cold atoms.

A detailed description of one or more embodiments is presented herein by way of exemplification and not limitation.

It has been discovered that an inertial point-source matter-wave atom interferometer gyroscope provides a simple, high dynamic range, and efficient extraction of phase map (SHEEP) for point source atom interferometry that includes subjecting cold atoms to laser pulses to measure the acceleration, rotation direction, and rotation rate of the inertial point-source matter-wave atom interferometer gyroscope. The inertial point-source matter-wave atom interferometer gyroscope can be used for inertial navigation. While conventional atom interferometers analyze data with conventional data processing and nonlinear function fitting, which is slow and can fail, the inertial point-source matter-wave atom interferometer gyroscope incorporating SHEEP obtains fringe images of gyroscope atoms in a plurality, e.g., four phase-shifted images, to measure a phase map. Each pixel value of an image is used to directly calculate gyroscope phase for determination of rotation rate, rotation direction, and acceleration in an absence of fitting nonlinear trigonometric and Gaussian functions to image data.

The inertial point-source matter-wave atom interferometer gyroscope directly measures the atom phase gradient pattern in a point source matter-wave atom interferometric image and has advantages over conventional devices and methods, including measuring smaller rotation rates, data processing without fitting a nonlinear function to a data image, a higher measurement bandwidth, a more reliable measurement due to common mode noise cancellation.

Inertial point-source matter-wave atom interferometer gyroscope 200 extracts inertial parameters from cold atoms. In an embodiment, with reference to FIG. 1, FIG. 2, FIG. 3, FIG. 10, FIG. 12, and FIG. 13, inertial point-source matter-wave atom interferometer gyroscope 200 includes: analyzer 212 that receives a plurality of fringe images 208 of gyroscope atoms 203, fringe images 208 including: first fringe image 208.1 that includes a first fringe phase, second fringe image 208.2 that includes a second fringe phase, third fringe image 208.3 that includes a third fringe phase, and fourth fringe image 208.4 that includes a forth fringe phase, wherein the first fringe phase, the second fringe phase, third fringe phase, and fourth fringe phase are different; phase mapper 215 of analyzer 212 that produces interferometric phase map 216 for gyroscope atoms 203 from fringe images 208 of gyroscope atoms 203; and fitter 217 of analyzer 212 in communication with phase mapper 215 and that receives interferometric phase map 216 from analyzer 212 and determines inertial parameters of gyroscope atoms 203 from interferometric phase map 216, the inertial parameters including acceleration 213, rotation direction 222, and rotation rate 214 of inertial point-source matter-wave atom interferometer gyroscope 200 relative to gyroscope atoms 203.

In an embodiment, inertial point-source matter-wave atom interferometer gyroscope 200 includes imager 207 that is in communication with analyzer 212 and that receives a plurality of atom cloud projection 206, produces fringe images 208 from atom cloud projections 206, and communicates fringe images 208 to phase mapper 215.

In an embodiment, inertial point-source matter-wave atom interferometer gyroscope 200 includes gyroscope gas cell 221 that is in communication with imager 207 and that receives gyroscope atoms 203, modulated light 202, and imaging light 205, produces each atom cloud projection 206 in response to receipt of imaging light 205, and communicates each atom cloud projection 206 to imager 207.

In an embodiment, inertial point-source matter-wave atom interferometer gyroscope 200 includes imaging light source 204 that is in communication with gyroscope gas cell 221 and that produces imaging light 205 and subjects gyroscope atoms 203 to imaging light 205 to produce each atom cloud projection 206.

In an embodiment, inertial point-source matter-wave atom interferometer gyroscope 200 includes modulated light source 201 that is in communication with gyroscope gas cell 221 and that produces the modulated light 202 and subjects the gyroscope atoms 203 in the gyroscope gas cell 221 to the modulated light 202. In an embodiment, modulated light 202 includes a laser pulse sequence including: a first laser pulse including a first laser pulse including a first laser power and first laser pulse width, a second laser pulse including a second laser power and second laser pulse width, and a third laser pulse including a third laser power and third laser pulse width, such that the first laser pulse, the second laser pulse, and the third laser pulse operate as matter-wave beam splitters, mirrors, and beam splitters, respectively. In an embodiment, the laser pulse sequence is a $\pi/2$-$\pi$-$\pi/2$ Raman laser pulse sequence. In an embodiment, the difference of laser phase of modulated light source 201 between acquiring individual fringe images 208 is $\pi/2$.

In an embodiment, inertial point-source matter-wave atom interferometer gyroscope 200 includes phase shifter 209 that is in communication with modulated light source 201 and that produces phase control signal 210 and communicates phase control signal 210 to modulated light source 201, such that a phase of modulated light 202 produced by modulated light source 201 changes in response to phase control signal 210.

Figure 12A:
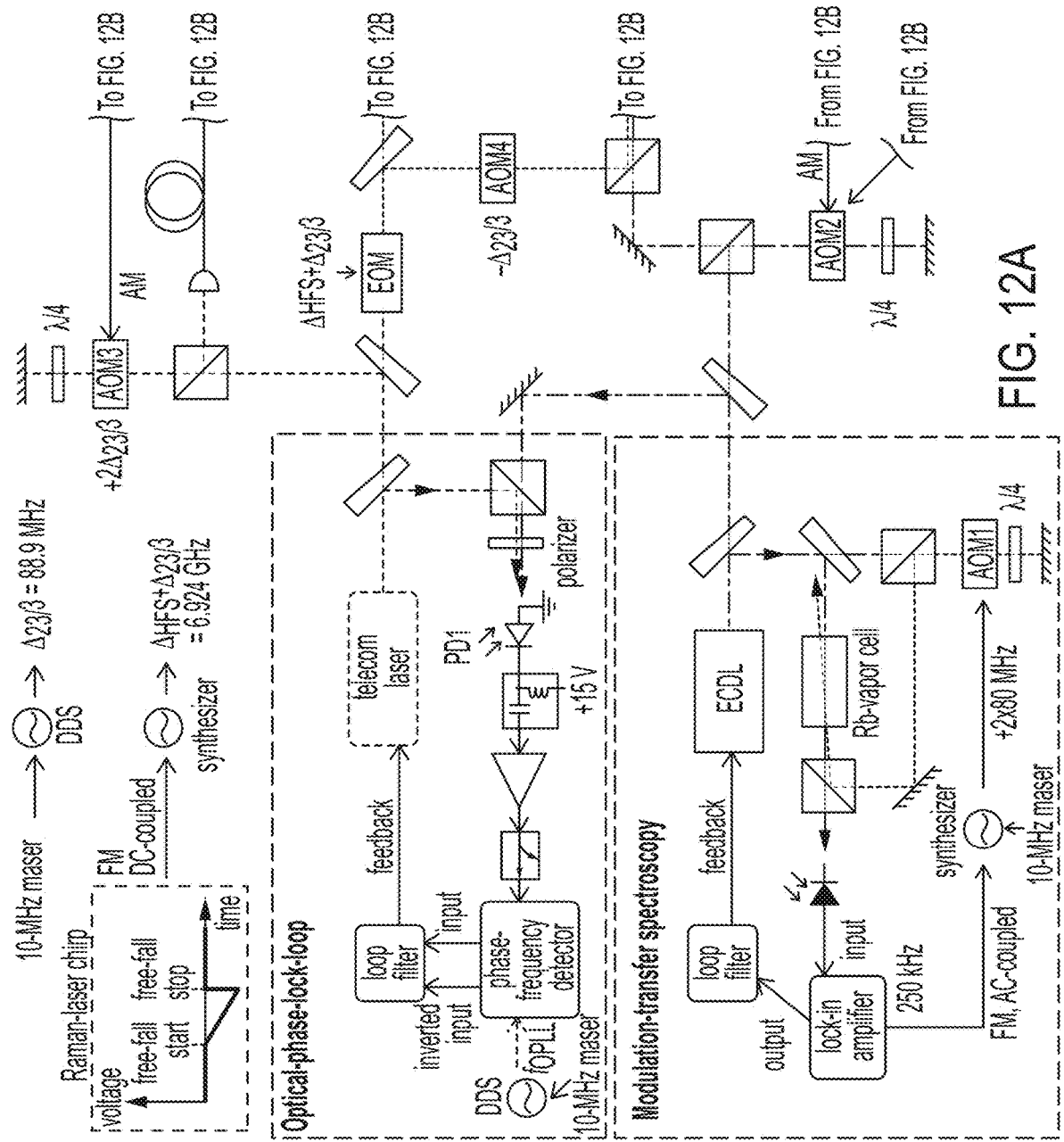
FIG. 12 shows a laser system for an inertial point-source matter-wave atom interferometer gyroscope. The ECDL is locked to $^{87}$Rb saturated absorption line. The telecom laser is locked to the ECDL by an OPLL. The set point $f_{OPLL}$ cycles through four frequencies. With EOM and AOMs, the system provides laser frequencies for the inertial point-source matter-wave atom interferometer gyroscope. Scanning of the Raman-laser chirp rate is done by varying the slope of the triangular waveform applied to the dc-coupled frequency-modulation (FM) port of the synthesizer. AM, amplitude modulation; BPF, bandpass filter; DDS, direct digital synthesizer; PD, photodiode; VCO, voltage-controlled oscillator.
Figure 12B:
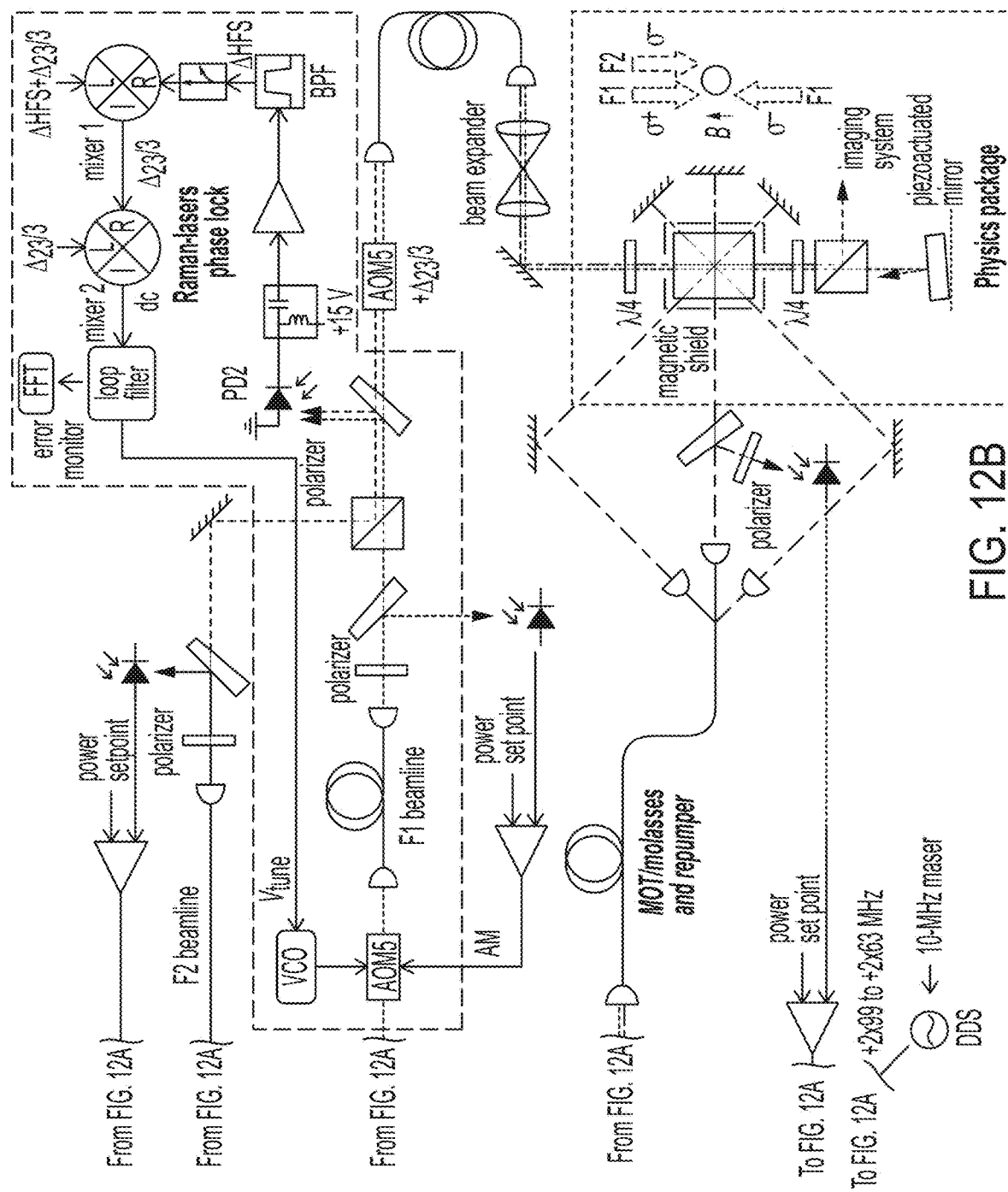
Figure 13:
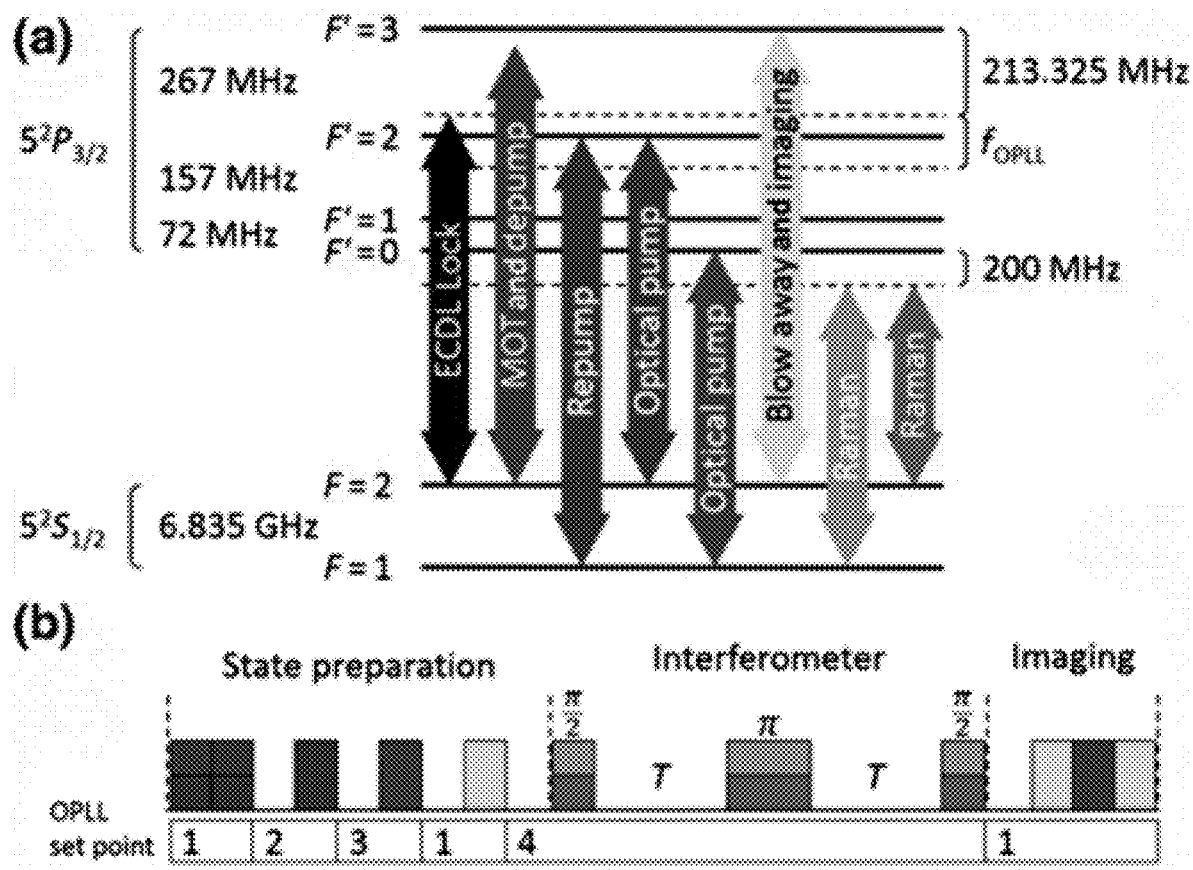
FIG. 13 shows laser transition frequencies (a) and timing sequence (b). The black arrow shows the ECDL frequency when it is locked. The OPLL set point ($f_{OPLL}$) cycles through four frequencies: 53.325 MHz (1), 319.975 MHz (2), 549.140 MHz (3), and 749.140 MHz (4). The repetition rate is 5 or 10 Hz.

Components of inertial point-source matter-wave atom interferometer gyroscope 200 can be made from and include various materials. The vapor atoms for gyroscope atoms 203 can be, e.g., alkali metal atom or alkaline earth metal. The gyroscope gas cell 221 can be a container that can be evacuated to a certain pressure and contain the vapor atoms for production of gyroscope atoms 203. Exemplary gyroscope gas cell 221 are vacuum chambers, optically transparent materials such as glass, quartz, and the like. A base pressure when loaded with vapor atoms can be less than $1 \times 10^{-7}$ Torr. Modulated light source 201 can be a visible or infrared laser that produces pulses of modulated light 202 or imaging light source 204, wherein the pulse characteristics of modulated light 202 are controlled by phase shifter 209 such as the configuration shown in FIG. 12 and other RF, electro-optic, acousto-optic, and other components. It should be appreciated that wavelengths of modulated light 202 and imaging light 205 are selected to produce quantum state selection of gyroscope atoms 203, wave-matter interferometry of gyroscope atoms 203, quantum state-selective imaging of gyroscope atoms 203, e.g., as shown in FIG. 13.

Imager 207 can be an image capturing device such as a charge coupled device camera with a duty cycle within the pulse repetition rate of imaging light source 204 or modulated light source 201. Analyzer 212 includes fitter 217 and phase mapper 215 that can be various data acquisition and analysis equipment including an oscilloscope, field programmable gate array, computer processor, digital-to-analog converter, and the like. Such equipment receives an arbitrary number of fringe images 208 from imager 207 and determines acceleration 213, rotation direction 222, and rotation rate 214 from fringe images 208.

The phase error of modulated light 202 incident on gyroscope atoms 203 must be less than a fraction of pi such that the phase between each of fringe image 208.1, fringe image 208.2, fringe image 208.3, and fringe image 208.4 is pi/2. The phase stability and phase error of the phase shifter 209, modulated light source 201, and other related components must be of appropriate quality and parameters. The noise due to the laser phase, vibrations of the system, and other noise sources is well-controlled to minimize the phase jitter between subsequent phase images fringe image 208.

Inertial point-source matter-wave atom interferometer gyroscope 200 can be made in various ways. It should be appreciated that inertial point-source matter-wave atom interferometer gyroscope 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, inertial point-source matter-wave atom interferometer gyroscope 200 can be disposed in a terrestrial environment or space environment.

In an embodiment, a process for making inertial point-source matter-wave atom interferometer gyroscope 200 includes: disposing modulated light source 201 and imaging light source 204 in optical communication with gyroscope gas cell 221 by optical fiber and/or free space propagation incident on a vacuum window; disposing vapor atoms for gyroscope atoms 203 in gyroscope gas cell 221 by a source such as an electrochemical dispenser device; connecting phase shifter 209 to modulated light source 201 for communication of phase control signal 210 to modulated light source 201; connecting phase shifter 209 to analyzer 212 for communication of phase shift timing signal 211 to analyzer 212 so that analyzer 212 can time acquisition and analysis of fringe images 208; disposing imager 207 in optical communication with gyroscope gas cell 221; and connecting imager 207 to analyzer 212.

Inertial point-source matter-wave atom interferometer gyroscope 200 has numerous advantageous and unexpected benefits and uses. In an embodiment, a process for extracting inertial parameters with inertial point-source matter-wave atom interferometer gyroscope 200 includes: subjecting gyroscope atoms 203 in expanding cold atom cloud 220 formed from point-source 219 of gyroscope atoms 203 to modulated light 202 and imprinting a laser phase of modulated light 202 onto gyroscope atoms 203 by optical fiber and/or free space propagation incident on a vacuum window; producing matter-wave interference among gyroscope atoms 203 in expanding cold atom cloud 220 formed from point-source 219 of gyroscope atoms 203 in response to subjecting gyroscope atoms 203 in expanding cold atom cloud 220 to modulated light 202, e.g., by pi/2-pi-pi/2 Raman pulse sequence; subjecting gyroscope atoms 203 in expanding cold atom cloud 220 to imaging light 205 by transmitting a collimated optical field through a window into the vacuum system containing the atoms; acquiring a plurality of fringe images 208 of expanding cold atom cloud 220 in response to subjecting gyroscope atoms 203 in expanding cold atom cloud 220 to imaging light 205, such that for the plurality of fringe images 208 a subsequent fringe image differs from an immediate prior fringe image by a difference in fringe phase by changing the relative frequency chirp rate between the set of Raman beam pairs; producing the difference in fringe phase by changing the laser phase of modulated light 202 between acquiring individual fringe images 208 by changing the relative frequency chirp rate between the set of Raman beam pairs; converting fringe images 208 into interferometric phase map 216; fitting a linear function of a first phase gradient, a second phase gradient, and an offset to obtain a first rotation phase gradient, a second rotation phase gradient, and acceleration phase, and the laser phase to interferometric phase map 216 to obtain the first rotation phase gradient, the second rotation phase gradient, and the acceleration phase by a mathematical analysis; and converting the first rotation phase gradient, the second rotation phase gradient, and the acceleration phase from the fitting of the linear function to interferometric phase map 216 into rotation rate 214 and acceleration 213 of inertial point-source matter-wave atom interferometer gyroscope 200 by using a mathematical analysis software package to extract inertial parameters including rotation rate 214, rotation direction 222, and acceleration 213.

In an embodiment, extracting inertial parameters includes disposing vapor atoms in gyroscope gas cell 221 by a source such as an electrochemical dispenser device, wherein gyroscope gas cell 221 is a rotational frame relative to the vapor atoms; producing gyroscope atoms 203 as point-source 219 by cooling the vapor atoms in gyroscope gas cell 221 by a magneto-optical trap, such that that gyroscope atoms 203 are laser cooled atoms, and gyroscope gas cell 221 is rotational frame relative to gyroscope atoms 203; and expanding cloud of gyroscope atoms 203 from point-source 219 as expanding cold atom cloud 220 by releasing it from the cold atom trap.

In an embodiment, extracting inertial parameters includes optically pumping gyroscope atoms 203 to a first sublevel, e.g., F=1, mF=0, of a ground electronic state, e.g., an singlet state, of gyroscope atoms 203 by laser beam pulses of appropriate polarizations, powers, and frequencies; and subjecting gyroscope atoms 203 to laser pulses of modulated light 202 applied in gyroscope gas cell 221 by optical fiber or free space propagation incident on a vacuum window transmitting a collimated optical field through a window into the vacuum system containing the atoms.

In an embodiment, extracting inertial parameters includes imaging gyroscope atoms 203 in expanding cold atom cloud 220 in a plane transverse to modulated light 202 with state-selective absorption of imaging light 205 by a laser beam pulse of appropriate polarization, power, and frequency imaged onto an imaging device such as charge-coupled device (CCD) camera. In an embodiment, imaging gyroscope atoms 203 in expanding cold atom cloud 220 includes: performing normalized detection of expanding cold atom cloud 220 by: acquiring a first image of gyroscope atoms 203 in a second sublevel, e.g., in 87Rb F=2 state, of the ground electronic state of gyroscope atoms 203, repumping all gyroscope atoms 203 in a first sublevel, e.g., in 87Rb F=1 state, to the second sublevel, e.g., 87Rb F=2, of the ground electronic state of gyroscope atoms 203, and acquiring a second image of gyroscope atoms 203 in the second sublevel of the ground electronic state by a laser beam pulse of appropriate polarization, power, and frequency. In an embodiment, extracting inertial parameters acquiring each fringe image 208 includes taking a ratio of the first image to the second image, such that fringe image 208 includes a population ratio of gyroscope atoms 203 in the second sublevel of the ground electronic state by calculation in mathematical analysis software. In an embodiment, obtaining the images 208 using the absorption of light by the atoms. In an embodiment, the plurality of fringe images 208 includes four fringe images, and the four fringe images 208 have different fringe phases. In an embodiment, interferometric phase map 216 includes: phase offset R due to an acceleration phase of a rotational frame and the laser phase; a rotation phase gradient; and a population ratio. In an embodiment, in acquiring the four fringe images 208, the fringe phase of each subsequent fringe image 208 acquired differs from the fringe phase of the previous fringe image 208 acquired by π/2. In an embodiment, changing the laser phase includes stepping a laser chirp rate to produce the difference in fringe phase prior to obtaining each fringe image 208 by modulating a frequency source that controls the laser frequency by a series of rf, acousto-optic, and/or electro-optic devices, wherein, in converting fringe images 208 into interferometric phase map 216, the linear function includes an inverse tangent function of the population ratio for the four fringe images. In an embodiment, stepping the laser chirp rate includes increasing a laser frequency chirp rate by ¼ $T_R^2$.

In an embodiment, in converting fringe images 208 into interferometric phase map 216, interferometric phase map 216 $\phi(x_i, y_j)$ is determined by $$\phi(x_i, y_j) = \tan^{-1}\left[\frac{P_2(x_i, y_j) - P_4(x_i, y_i)}{P_3(x_i, y_j) - P_1(x_i, y_j)}\right] + n\pi,$$

wherein $x_i$, $y_j$ are pixels of interferometric phase map 216; and $P_1$, $P_2$, $P_3$, and $P_4$ are respectively population ratios of first fringe image 208.1, second fringe image 208.2, third fringe image 208.3, fourth fringe image 208.4 of the plurality of fringe images 208.

In an embodiment, in fitting the linear function to interferometric phase map 216, the linear function is provided by $$f(x,y) = k_x x + k_y y + \phi_0,$$

wherein $\phi_0$ is the sum of an acceleration phase of inertial point-source matter-wave atom interferometer gyroscope 200 and the laser phase, and $k_x$ and $k_y$ are components of the rotation phase gradient respectively along axes orthogonal to a propagation direction of modulated light 202.

In an embodiment, extracting inertial parameters includes converting $k_x$ and $k_y$ from interferometric phase map 216 into rotation rate 214 according to $$k_x = -\frac{2k_{eff} T_R^2}{T_{ex}} \Omega_y \text{ and } k_y = \frac{2k_{eff} T_R^2}{T_{ex}} \Omega_x,$$

wherein $k_{eff}$ is an effective wave vector of modulated light 202, $\Omega_x$ and $\Omega_y$ are components of a rotation vector of inertial point-source matter-wave atom interferometer gyroscope 200 in a plane orthogonal to the direction of propagation of modulated light 202 which provides the inertial parameter rotation direction 222; $T_R$ is time between pulses of modulated light 202 during producing matter-wave interference among gyroscope atoms 203 in expanding cold atom cloud 220, and $T_{ex}$ is a total expansion time of expanding cold atom cloud 220. In an embodiment, $T_{ex} \geq 2T_R$.

In an embodiment, in subjecting gyroscope atoms 203 in expanding cold atom cloud 220 to modulated light 202, modulated light 202 includes a laser pulse sequence including: a first laser pulse including a first laser pulse including a first laser power and first laser pulse width, a second laser pulse including a second laser power and second laser pulse width, and a third laser pulse including a third laser power and third laser pulse width, such that the first laser pulse, the second laser pulse, and the third laser pulse act as matter-wave beam splitters, mirrors, and beam splitters, respectively. In an embodiment, the laser pulse sequence includes a $\pi/2$-$\pi$-$\pi/2$ Raman laser pulse sequence.

In an embodiment, producing phase control signal 210 includes controlling and stabilizing the relative phase between the pair of Raman beams with low phase noise components via their optical beat note, including synthesizers, photodiodes, optical phase lock loop electronics, and rf components; and controlling the modulated light 202 phases with phase control signal 210 includes various synthesizers, electro-optic, or acousto-optic devices.

In an embodiment, in changing the laser phase of modulated light 202 between acquiring individual fringe images 208, the laser phase is changed by $\pi/2$ by modulating a frequency source that controls the laser frequency by a series of rf, acousto-optic, or electro-optic devices.

According to an embodiment, inertial point-source matter-wave atom interferometer gyroscope 200 uses a set of four phase-shifted fringe images for directly determining a spatially-dependent atom phase map for measurements of rotation direction, rotation magnitude, and acceleration. For each fringe image, the laser phase is shifted such that the set of images advances through a full 360 degrees of phase, tracing out the physical sinusoidal variation in the atom population corresponding to the intensity at each pixel on a CCD camera. Extracting inertial parameters traces out of the sine wave while taking data so that data does not need to be fit to a sine wave in image post-processing. Instead, the atom population for each of the four images is used to calculate the phase map and from that the rotation and acceleration by subtracting pairs of pixel values from each other and taking the arctangent of their ratio. Extracting inertial parameters significantly simplifies data acquisition, processing, and analysis as compared with conventional methods. That the fringe images provide rotation values without nonlinear fitting is advantageous for measuring rotations that are relatively slow such that a full fringe period is not visible across the atom cloud. Inertial point-source matter-wave atom interferometer gyroscope 200 overcomes the issue wherein slow rotation rates are not measurable without large errors due to nonlinear curve fitting of image fringes. Extracting inertial parameters with this phase map method also increases processing speed and allows fringe patterns to be easily analyzed within a nonuniform cloud envelope or low fringe contrast, all of which are involved in real-time deployed navigation devices. Here, phase shifting can occur by adjusting the laser frequency chirp rate with a controller such as a frequency synthesizer and electro-optic modulator. Precise control of this laser chirp rate is provided for inertial point-source matter-wave atom interferometer gyroscope 200 and extracting inertial parameters to reconstruct an accurate phase map.

Conventional PSI atom interferometers typically filter an image of atom fringes followed by fitting the pattern of the fringes to a nonlinear function including a sine wave and Gaussian envelope, wherein filtering and nonlinear fitting involve considerable data acquisition run-time or computer analysis power. When the rotation rate is high, there are many sinusoidal fringe stripes across the atom cloud. However, when the rotation rate is low, the fringe period is much larger than the atom cloud width and a sinusoidal fit will fail since the fringe data looks like a slight curve or straight line. Because point-source atom interferometry measures the rotation vector projected into a plane, the fit is done in two dimensions and can be computationally intensive without proper fitting parameter initialization and adequate fitting time. The contrast of atomic fringes is typically less than 50% for a centimeter-scale interferometer. These low-contrast fringes are superimposed on a nonuniform envelope of the atomic cloud that leads to a nonlinear function and therefore complicates fitting. Inertial point-source matter-wave atom interferometer gyroscope 200 phase-shifts the laser phase to calculate the phase map to eliminate these problems. Advantageously, extracting inertial parameters directly using the phase map provides the rotation direction and rotation rate without involving any nonlinear fitting analysis and performs pixel-by-pixel analysis.

Conventional processes such as principal component analysis (PCA) involves image filtering for noisy data that can remove fringe jitter due to, e.g., laser frequency shifts, vibration, and optical system imperfections. Depending on the noise in the system and fringe images, many images, e.g., 10 images, are used to produce one measurement of acceleration and rotation, which reduces bandwidth of the conventional device.

Inertial point-source matter-wave atom interferometer gyroscope 200 and extracting inertial parameters disclosed herein have numerous beneficial uses, including inertial navigation, gyrocompassing, precessing rotation vector directions, and applications with a large range of possible system rotation rate magnitudes. Advantageously, inertial point-source matter-wave atom interferometer gyroscope 200 and processes herein overcome limitations of technical deficiencies of conventional technology, including inability to measure rotation at very low rotation rates, high rotation measurement error at low rotation rates, the use of complex and computationally intensive data analysis and nonlinear mathematical fitting techniques, slower measurements, inability to measure low rotation rates without a priori knowledge of the expected rotation rate magnitude, and higher common-mode measurement noise. Overall, with simpler processing and experimental implementation, Inertial point-source matter-wave atom interferometer gyroscope 200 and extracting inertial parameters makes compact portable gyroscopes more feasible and makes high-precision laboratory-based instruments more accurate.

Inertial point-source matter-wave atom interferometer gyroscope 200 and processes herein unexpectedly has advantages including measuring smaller rotation rates, improved accuracy of measurements of low rotation rates, data processing without fitting a nonlinear function to a data image, a higher measurement bandwidth, and a more reliable measurement due to common mode noise cancellation. The process and device are experimentally simple to implement with a phase-shifting device as the main element and the measurement calculation is simple to do, involving subtraction and an arctangent and a linear fit. No a priori knowledge of the rotation magnitude is needed, unlike for competing processes so no changes to the experiment or data processing techniques are needed to measure a wide range of possible inertial rotations.

The articles and processes herein are illustrated further by the following Examples, which are non-limiting.

EXAMPLES

Example 1. Robust Inertial Sensing with Point-Source Atom Interferometry for Interferograms Spanning a Partial Period Point source atom interferometry (PSI) uses the velocity distribution in a cold atom cloud to simultaneously measure one axis of acceleration and two axes of rotation from the spatial distribution of interferometer phase in an expanded cloud of atoms. Previously, the interferometer phase has been found from the phase, orientation, and period of the resulting spatial atomic interference fringe images. For practical applications in inertial sensing and precision measurement, it is important to be able to measure a wide range of system rotation rates, corresponding to interferograms with far less than one full interference fringe to very many fringes. Interferogram analysis techniques based on image processing used previously for PSI are challenging to implement for low rotation rates that generate less than one full interference fringe across the cloud. We introduce a new experimental method that is closely related to optical phase-shifting interferometry that is effective in extracting rotation values from signals consisting of fractional fringes as well as many fringes without prior knowledge of the rotation rate. The method finds the interferometer phase for each pixel in the image from four interferograms, each with a controlled Raman laser phase shift, to reconstruct the underlying atomic interferometer phase map without image processing.

Rotation sensing with optical and matter-wave interferometers has a long tradition. Analogous to the Sagnac phase shift in a laser gyroscope, in a rotating frame, an atom interferometer experiences a Sagnac phase shift proportional to the inner product of the rotation vector and the Sagnac area. For guided-wave atom interferometers, the matter-wave trajectories follow the guide geometry, and the Sagnac area is fixed. For free-space atom interferometers, the Sagnac area depends on atoms' initial velocity, and there are different approaches to handle this degree of freedom. For instance, in beam atom interferometers, the atomic beam has a wide velocity distribution in the longitudinal direction. At high rotation rates the signals from different velocity classes average out, leading to vanishing fringe contrast, whereas at low rotation rate the signals have high fringe contrast. In launched atom interferometers, cold-atom sources are used because they have a velocity distribution with reduced width, and the atoms are launched with an initial velocity in a controllable fashion.

Contrary to the above-mentioned conventional atom interferometry techniques, point source atom interferometry (PSI) uses the velocity distribution of an expanding cold-atom cloud to simultaneously operate many Sagnac interferometers. In the expanding cloud, different velocity classes have different Sagnac areas, all of which contribute to the final interferometer signal. PSI maps the signal from each velocity class onto a unique point in the image plane, using the position-velocity correlation of the expanded point source. Because of that parallel operation, PSI measures one axis of acceleration and two axes of rotation from a single cold-atom source and without interleaving measurements. PSI is also distinct from conventional atom interferometer gyroscope techniques because a single rotation measurement with PSI yields a unique reading for the system rotation rate.

In PSI, a $\pi/2$-$\pi$-$\pi/2$ Raman laser pulse sequence is applied to an ensemble of cold atoms as it expands. Assuming the Raman laser beams are counter-propagating along the z-axis, the components of the rotation vector projected onto the xy-plane generate an interferometer phase gradient with the following x and y components, $$k_x = -\frac{2k_{eff}T_R^2}{T_{ex}}\Omega_y \text{ and } k_y = \frac{2k_{eff}T_R^2}{T_{ex}}\Omega_x, \quad (1)$$

where $k_{eff}$ is the effective wave vector of the Raman laser, $\Omega_x$ and $\Omega_y$ are the components of the rotation vector in the xy-plane, $T_R$ is the time between the Raman pulses, and $T_{ex}$ is the total expansion time of the cold-atom cloud ($T_{ex} \geq 2T_R$). This phase gradient results in a sinusoidal fringe pattern in the population distribution across the final cloud. In principle, the rotation rate can be extracted from a single fringe image, but clockwise and counter-clockwise rotations remain indistinguishable. The rotation direction can be determined by taking a series of fringe images while scanning the Raman laser phase and observing the direction that the fringes travel. The acceleration along the Raman beam direction and the Raman laser phase determine the phase of the fringes in the image.

Because PSI fringe images are essentially windowed pictures of monochromatic plane waves, a host of methods from wave optics can be applied to analyze the images. It is intuitive to use parametric fitting to extract the fringe contrast, orientation, frequency, and phase, where the latter three parameters can be converted to rotation and acceleration readings. However, parametric fitting to a fraction of a fringe period that has an unknown phase is challenging because, in practice, the plane wave is usually damped with a Gaussian envelope due to the spatial variation of the atomic distribution or contrast and there is other noise in the images. Since the phase gradient (and thus the number of fringes) is proportional to the rotation rate, a lower rotation rate that generates less than one fringe period can result in a measurement with significant error, except when the signal-to-noise ratio is excellent.

There is a problem with measuring small rotations in the partial-fringe regime (where there is less than one period fringe in the images) when they measured the Earth's rotation using PSI. A counter-rotation can null the phase gradient and yield the Earth rotation rate. Instead of parametric fitting the entire cold-atom image to obtain the phase gradient as the counter-rotation is scanned, one can detect the differential phase between the left-half and right-half of a cold-atom cloud with an ellipse fitting procedure.

There also is a problem of measuring small rotations in the partial-fringe regime using a gyrocompass measurement, wherein an experimental phase shear, in the form of the Raman laser beam-tilt for the third Raman pulse, can be applied to the cold-atom cloud to increase the number of fringes across the cloud to about 2.5 so that their parametric fitting procedure can be performed on multiple fringes.

However, instead of analyzing fringe images, one converts the fringes in the population distribution into an interferometric phase map, which allows a direct analysis of the phase gradient and the acceleration phase, independent of the number of fringes. This is accomplished by an experimental method that converts four fringe images into a phase map, analogous to the phase shifting interferometry technique in optical interferometry. This process is referred to as simple, high dynamic range, and efficient extraction of phase map (SHEEP) that extracts inertial parameters with an inertial point-source matter-wave atom interferometer gyroscope. SHEEP does not lose sensitivity in the partial-fringe regime. SHEEP operates on every individual pixel in the images. In SHEEP, the fringe contrast has no effect on determining the rotation rate. Common-mode noise, e.g., due to the imperfections in the imaging system, is strongly suppressed. Both effects would otherwise be hard to remove with normalized detection alone. Although SHEEP takes more than one fringe image to yield a rotation measurement, it dramatically improves the measurement's robustness.

As will be demonstrated in the following sections, SHEEP returns robust rotation readings and is independent of the fringe phase or the number of fringes in the image because the analysis is performed on a pixel-by-pixel basis. SHEEP does not require additional experimental means, such as a compensation rotation or an additional Raman beam tilt, to perform well at low rotations. Further, SHEEP does not require a calibration of the fringe contrast. These features add up to unparalleled robustness and efficiency that makes SHEEP simple and robust for real-time portable applications.

Figure 3:
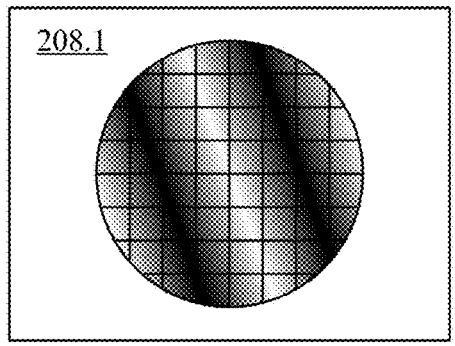
FIG. 3 shows four fringe images, wherein each fringe image's phase differs from the immediate prior fringe image by $\pi/2$. $\beta$ is an unknown fringe phase due to an acceleration phase and Raman laser phase. The $\pi/2$ phase stepping was made by stepping the Raman laser chirp rate. In extracting inertial parameters from the fringe images a phase map is produced that includes $\beta$ and a rotation phase gradient. Extracting inertial parameters is independent of fringe contrast, fringe orientation, fringe frequency, or fringe phase.
Figure 3:
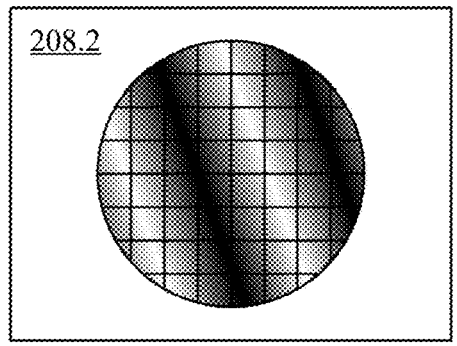
Figure 3:
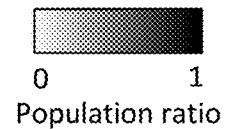
Figure 3:
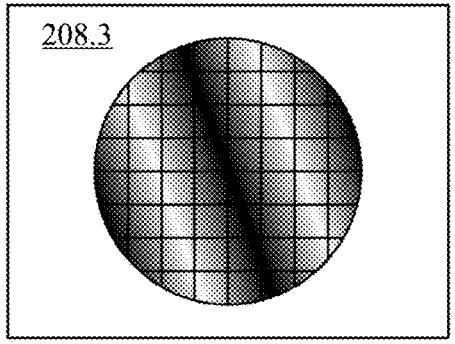
Figure 3:
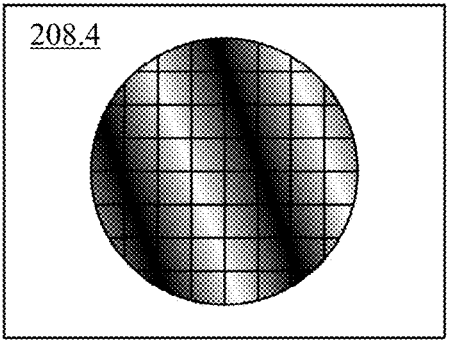
Figure 3:
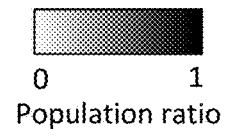
Figure 3:
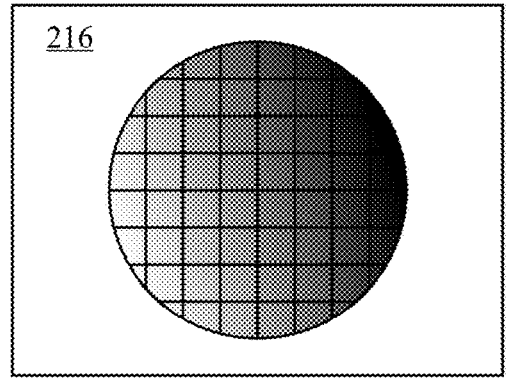
Figure 3:
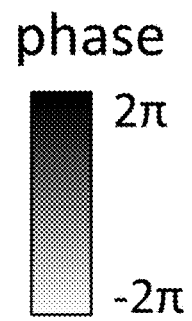

Regarding extraction of the phase map, FIG. 3 shows SHEEP for conversion of four fringe images into a phase map. This conversion is an inverse tangent function of a series of four fringe images, in which the laser phase used to acquire each fringe image differs from the previous one by $\pi/2$. Stepping of the fringe phase by $\pi/2$ is done by increasing the Raman laser frequency chirp rate by $\frac{1}{4}T_R^2$ each time a new image is taken. Prior knowledge of fringe contrast, orientation, frequency, or phase is not needed to determine the phase map.

The four fringe images' population ratios are labelled as P1, P2, P3, and P4. Under the assumption that the rotation rate does not change substantially in one measurement sequence, the pixel value in each image is nominally described by a sinusoidal function of the phase, $$P_L(x_i, y_l) = \frac{1}{2}\left[1 - c(x_i, y_l)\cos\left(\phi(x_i, y_l) + 2\pi\Delta\alpha_L T_R^2\right)\right] \quad (2)$$

wherein L=1, 2, 3, or 4 is the image number, $(x_i,y_j)$ labels the pixel in the ith column and jth row, $c(x_i,y_j)$ is the contrast of the pixel $(x_i,y_j)$ and is not assumed to be constant over the range of the cold-atom cloud, $\phi(x_i,y_j)=\phi_\Omega(x_i,y_j)+\phi_a+\phi_l$ is the phase map that contains the rotation phase $\phi_\Omega(x_i,y_j)$, acceleration phase $\phi_a$, and the Raman laser phase $\phi_l$, and $\Delta_{aL}$ is the difference in the Raman laser chirp rate from $\alpha_0$ in image L. $\alpha_0$ is the Raman laser chirp rate that compensates for the Doppler shift due to the free fall of the atoms. Without loss of generality, we assume $\Delta_{\alpha 1}=0$.

We step the chirp rate such that $(\Delta\alpha_{L=1}-\Delta\alpha_L)\times 2\pi T_R^2=\pi/2$ and calculate the phase map as $$\phi(x_i, y_l) = \tan^{-1}\left[\frac{P_2(x_i, y_j) - P_4(x_i, y_l)}{P_3(x_i, y_j) - P_1(x_i, y_j)}\right] + n\pi, \quad (3)$$

wherein n is an integer that removes discontinuities in the phase map.

The contrast of each pixel $c(x_i,y_j)$ is a common factor of the numerator and denominator in the argument of the inverse tangent and cancels out in the calculation. Thus, the phase map is separated from the spatial distribution of atoms and the spatially-dependent Raman laser Rabi frequency. The phase of each pixel in the phase map is computed from the pixel's own amplitudes as it steps through a full $2\pi$ oscillation. This operation is independent of the values of neighboring pixels, and thus robust against any background structure of the image.

The output range of the inverse tangent is between $-\pi/2$ and $\pi/2$, resulting in discontinuities in the phase map when the rotation rate is high enough that multiple fringes are created across the cloud. Unwrapping the inverse tangent output, i.e., determining the value of nn in Eq. (3), does not change the phase gradient. We note that the value of n changes the global offset of the entire phase map in steps of $\pi$, arising from the fact that the acceleration measurement in PSI is fundamentally ambiguous over phase multiples of $2\pi$, as in conventional atom interferometers. Additional techniques can be implemented to resolve the ambiguity problem, which is especially important for portable applications.

Regarding phase map analysis versus fringe image analysis, the phase map f(x,y) can be described by a simple linear model with only three fitting parameters, $$f(x,y)=k_x x+k_y y+\phi_0, \quad (4)$$

wherein $\phi_0$ is the sum of the acceleration phase and the Raman laser phase, $k_x$ is the rotation phase gradient in the x-axis, and $k_y$ is the rotation phase gradient in the y-axis. All three parameters are useful in inertial sensing. The rotation components are recovered from the phase gradients via the relations in Eq. (1). The acceleration along the z-axis, $a_z$, can be recovered by the relation $az=\phi_0/(k_{eff}T_R^2)$.

The experimentally-obtained fringe images can be modeled as a plane wave that has five fitting parameters, $$g(x,y)=c\cos(k_x x+k_y y+\phi_0)+g_0, \quad (5)$$

wherein the additional fitting parameters are c, the contrast of the fringes (assumed to be constant over the range of the cold-atom cloud), and $g_0$, the overall background. If the Gaussian envelope cannot be removed by a normalized detection scheme, the fringe images may be modeled by including an additional Gaussian envelope, though at the cost of requiring more fitting parameters.

The phase gradients, the contrast, and the fringe phase are all fitting parameters in the sinusoidal function. In principle, the fitting procedure should not require prior knowledge to return reasonable values of the parameters. However, parametric fitting of the fringe images with sinusoidal functions is not as robust as linear fitting of phase maps. The simplification from sinusoidal fitting with five parameters (fringe analysis) to linear fitting with three parameters (phase map analysis) contributes to the robustness of SHEEP. However, since the same image data is used in each method, the effects of quantum projection noise should be the same for both methods and their effects on the Allan deviation are calculated.

$^{87}$Rb atoms are laser-cooled in a glass vacuum cell with a 1 cm$^2$ cross-sectional area. At the beginning of each experimental sequence, the atoms are loaded into a six-beam magneto-optical trap (MOT). The cloud of atoms is made smaller and colder with compressed-MOT and molasses stages, resulting in an initial atomic cloud with a diameter of 0.4 mm and a temperature lower than 10 µK. The loading and cooling of the atoms into the MOT takes 138 ms. Typically, there are 6×10$^6$ atoms in the cloud. The freely-expanding cloud of atoms is then transferred to the F=1, $m_F$=0 sublevel of the ground state by optical pumping with an efficiency of at least 85%. The Raman $\pi/2$-$\pi$-$\pi/2$ laser pulses are applied in the direction of the local gravitational field. The π-pulse duration is 5 µs and the time between pulses is $T_R$=7.8 ms. After the pulse sequence, the cloud is imaged in the plane transverse to the Raman laser beams with state-selective absorption imaging. At the time of imaging, $T_{ex}$=25.9 ms, the cloud has expanded by a factor of 4 and fallen by 3 mm. We perform normalized detection by taking an image of the atoms in the F=2 state, repumping all atoms to F=2, and then taking a second image of the atoms in the F=2 state. The fringe image is obtained by taking the ratio of the first image to the second image and plotting the population ratio of the atoms in F=2 state. The total experimental cycle time is 166.7 ms. Due to our camera frame rate, it takes one second to acquire the four population ratio images to establish one phase map.

The laser beams that drive the two-photon Raman transitions between the $^{87}$Rb F=1 and F=2 states are spatially superimposed with orthogonal circular polarizations. A bias magnetic field is applied in the direction parallel to the laser beams. The laser beam driving the transition from the F=1 state to an intermediate state is denoted as the "F1 beam," and the other laser beam driving the transition from the F=2 to the intermediate state is denoted as the "F2 beam." The F1 beam is retro-reflected back to the atoms after passing through the cell, and the polarization is reversed from $\sigma^-$-polarization to $\sigma^+$-polarization. The counter-propagating pair of the F1 beam and the F2 beam is used to transfer photon momenta to the atoms. The co-propagating pair of the F1 beam and the F2 beam drives magnetically-sensitive transitions, which are tuned off resonance by the bias magnetic field.

During the Raman interrogation, the frequency of the F1 beam is chirped with a direct digital synthesizer at $a_0$=−25.1 kHz/ms to compensate for the Doppler shift due to the free fall of the atoms. Varying the chirp rate around $a_0$ also scans the overall interferometer phase and translates the spatial fringes across the image plane.

Rotation of the lab frame causes the direction of both Raman beams to rotate about the free-falling atoms. We simulate rotation by piezoelectrically sweeping the angle of the retro-reflection mirror of the Raman F1 beam, which causes a phase shift that is equivalent to the shift caused by the rotation of the lab frame for small mirror rotation angles. The simulated rotation rate is constant during the acquisition of the four fringe images.

The phase map analysis is compared with fringe analysis by conventional parametric fitting. For the phase map analysis, we extract the phase map with SHEEP, then apply a 2D linear fit to the phase map with Eq. (4). For the fringe analysis, we process all four images and then take the average of the results since we convert a series of four fringe images into one phase map. The full cycle period for the measurements with the two techniques are equal. We first perform principal component analysis (PCA) on the set of four images to remove some background noise, and then apply a 2D curve fit to the four cleaned fringe images with the plane wave function in Eq. (5). We refer to this approach as the "PCA method," which has been used in previous PSI works. PCA is model-free, and has been used in different atomic systems to remove noise in the images before analyzing the data with a physical model. There are other model-free noise-removal techniques, such as the one demonstrated in. The comparison is between one phase map and four fringe images.

The determination of rotation rates using PSI in the partial fringe regime occurred in which ground vibrations caused noise on the interferometer such that the fringe phase varied by more than $2\pi$ from shot to shot. By splitting the atom cloud spatially into two halves, a parametric analysis could be carried out in which the relative phase of the two resulting interferometers was established and the effects of vibrations could be removed. The presence of the vibrations allowed the full $2\pi$ range of fringe phases to be measured, albeit randomly, and the relative phase to be measured precisely. SHEEP uses four images with well-defined fringe phases to extract the rotation rate in the absence of vibrational noise.

The ellipse fitting procedure in typically uses a minimum of six images to allow for extraction of the phase map in the presence of vibration phase noise that randomizes the offset phase in the images. Since our experiment has a much shorter interrogation period, the phase noise from vibration is significantly smaller than $2\pi$, and rotation information can be extracted without employing techniques like ellipse fitting.

With regard to azimuthal scans of fixed-magnitude rotation vectors, a rotation vector was applied in the plane perpendicular to the Raman laser beams with a fixed rotation rate while stepping the direction of the rotation from 0 to 360 degrees in two-degree steps. In each rotation step, a series of four fringe images with fringe phases of 0, $\pi/2$, $\pi$, and $3\pi/2$ to the unknown acceleration phase and the Raman laser phase was recorded. The sets of four images were processed with SHEEP and the PCA method separately and plot the measured rotation phase gradients versus the azimuthal angle of the applied rotation vector.

Figure 4:
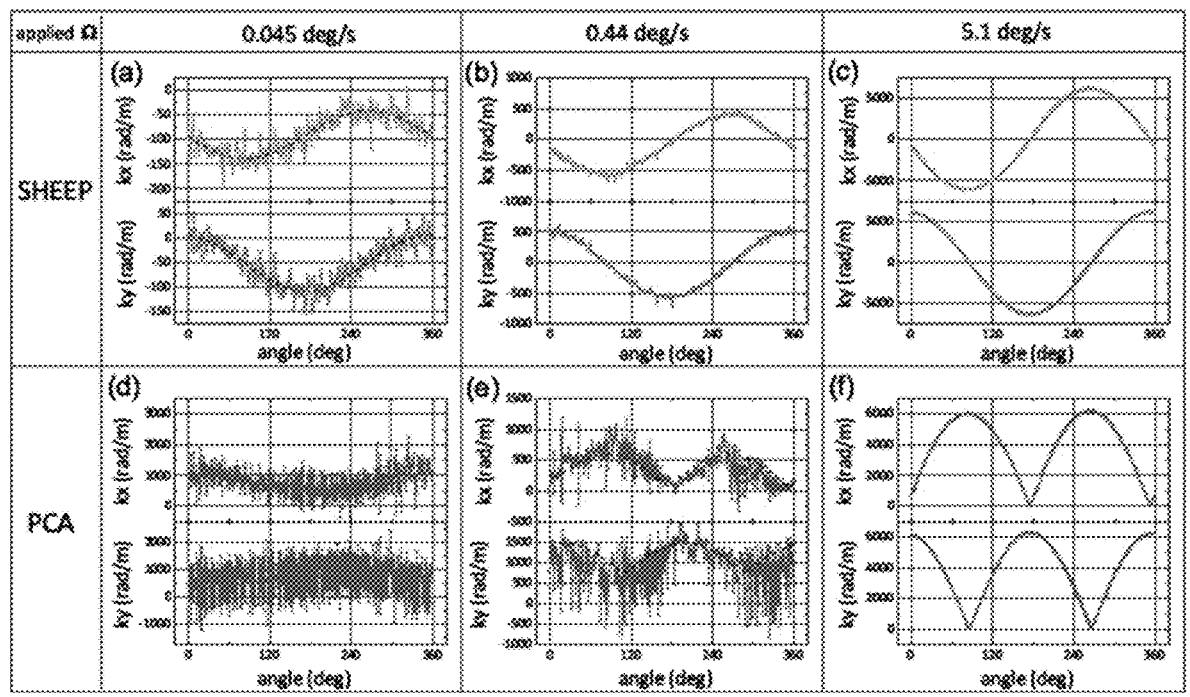
FIG. 4 shows azimuthal scans of fixed-magnitude rotation vectors with the empirical data processed by extracting inertial parameters and a Principal Component Analysis (PCA) method for indicated rotation rates. A half-length of an error bar for each point is the value of 2D fit error. In (a), the dashed lines are sine and cosine fits to the time traces. In (e), the dashed lines are magnitude-sine and cosine fits. The SHEEP method produces clearer fringes than PCA at low rotation rates leading to a better assessment of the rotation rate from the data.

The traces obtained by SHEEP and the PCA method are shown in FIG. 4 for three different rotation rates. Because the rotation vector processes about the direction of the Raman laser beams, the x-component of the phase gradient follows a sine curve while the y-component of the phase gradient follows a cosine curve, via the relation in Eq. (1).

Qualitatively, SHEEP resolves the sinusoidal variation in all three cases, while the PCA method loses sensitivity as the rotation rate becomes smaller.

In FIG. 4 the traces of the PCA method are plotted as the absolute value of the rotation phase gradient because the sign of the phase gradients $k_x$ and $k_y$ returned by the plane wave fitting is not computed (since it is not needed for the sensitivity comparison). In the PCA method, an extended experimental procedure and additional analysis would be needed to use the phase information and to determine the direction of the fringe travel, and thus the sign of the phase gradient. It is noted that SHEEP method distinguishes between a counter-rotation and a rotation without any additional analysis needed, which amounts to a practical advantage.

There is a non-zero phase gradient offset even when there is no applied rotation. This phase gradient offset did not noticeably change during the acquisition time of each data set. An example of this phase gradient offset is visible in FIG. 4(a), where both sinusoidal curves are centered at a non-zero value in the vertical direction. The non-zero, slow-varying phase gradient offset in the experimental data may arise from technical sources, such as the Raman laser beam wavefront not being uniform.

Figure 5:
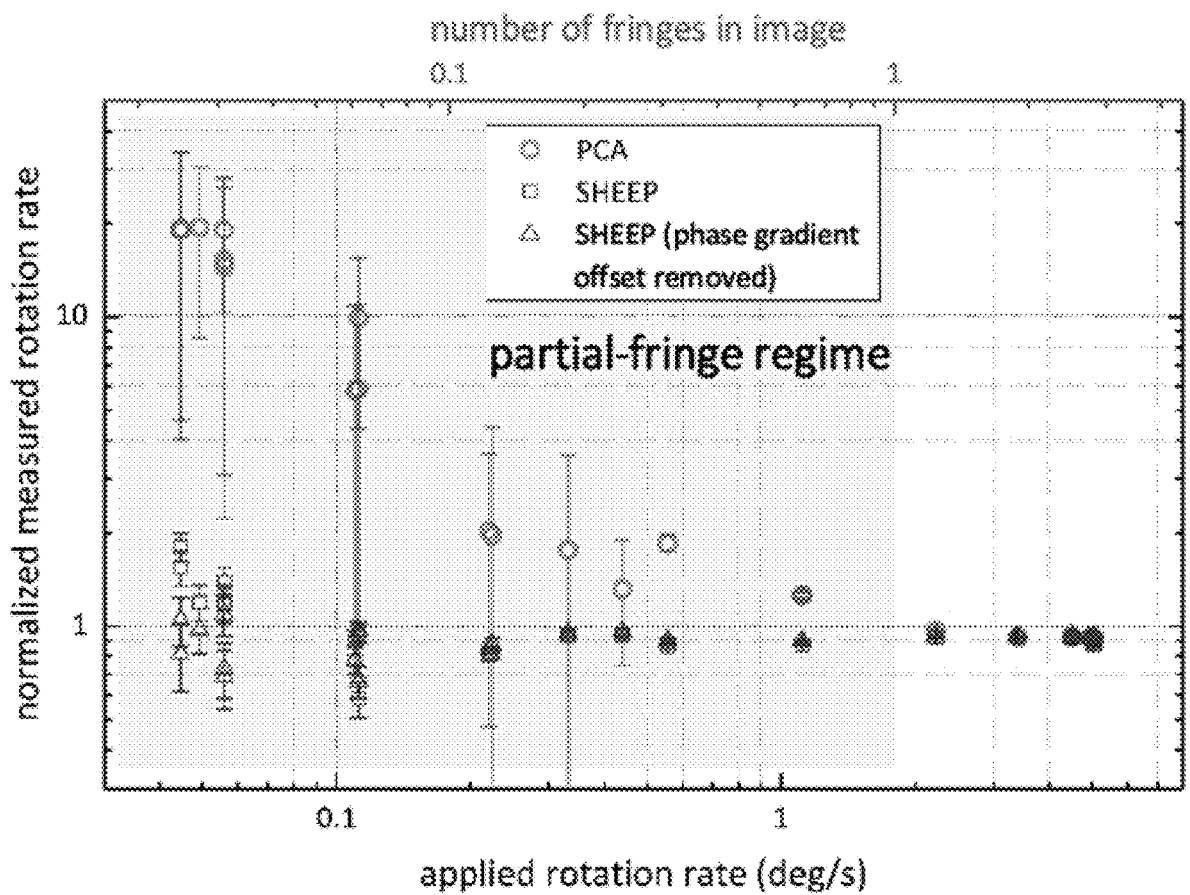
FIG. 5 shows a graph of normalized measured rotation rate versus applied rotation rate for fit results of single rotation measurement in extracting inertial parameters and a PCA method. Here, the normalized measured rotation rate was obtained for each fitting procedure. The half-length of the error bar is the normalized 2D-fit standard error. The error bars are longer at lower rotation rates for the PCA method because it is more difficult to fit a sinusoidal function when there is less than one fringe in the image. The top horizontal axis is a calculated number of fringes along the diagonal of an image versus the rotation rate for an ideal point source, $(2k_{eff}T_R^2)/(T_{ex})\times\Omega\times(d/2\pi)$, with d=2.6 mm as a length of the diagonal, $T_R$=7.8 ms, and $T_{ex}$=25.9 ms. In the partial fringe regime, around 0.2 to 0.4 degrees/s, two data points for the PCA method have error bars may extend to negative values because symmetric error bars are used. However, the normalized rotation rate is positive. The SHEEP method produces a more accurate measurement of the rotation rate with smaller error than PCA at low rotation rates leading to a better assessment of the rotation rate from the data.

Regarding statistical error of single rotation measurement, FIG. 5 shows the results of a single rotation measurement (of a set of four images) returned from the PCA method (pink circles) and SHEEP (green squares and purple triangles) at different rotation rates. Both the measured rotation value and the error in FIG. 5 are normalized to the applied rotation rate. The two methods return similar normalized values and errors when the images have more than one fringe; however, the PCA method worsens immediately when the number of the fringes in the image is less than one, while the normalized value and the error of SHEEP remains low down to the lowest rotation rates studied. In other words, the two methods are similar in the multiple-fringe regime; however, in the partial-fringe regime, the PCA method gradually loses sensitivity. Contrary to the PCA method, SHEEP remains robust without any correction and the dynamic range is at least 10 dB better than that of the PCA method. The dynamic range of SHEEP is further improved when the phase gradient offset (at zero applied rotation rate) is removed (purple triangles).

For a perfect point source, the normalized rotation should be one, i.e., with a scale factor that equals one. However, the scale factor is expected to be around 0.9 in this work because the cold-atom cloud expands by a factor of about four and is therefore not an ideal point source.

The rotation phase gradient, and thus the number of fringes, scales with the rotation rate and the time between the Raman laser pulses (assuming $T_{ex} \approx 2T_R$; see Eq. (1)). In this work, $T_R$ is 7.8 ms due to the small size of our experimental setup. We also plot the calculated number of fringes of an ideal point source in FIG. 5 in order to highlight the fact that the measurement covers both the multiple-fringe regime and partial fringe regime. Due to the reduced scale factor, the actual number of fringes is slightly lower.

Regarding Allan deviation of the rotation measurement, we also record a time series of images where the applied rotation rate and the rotation direction are fixed. We repeat the measurement at a few different applied rotation rates, including zero applied rotation rate. FIGS. 6(a) and (b) show two samples of Allan deviation plots at an applied rotation rate of 3.2 deg/s and zero applied rotation rate, respectively. The Allan deviation curves from SHEEP and the PCA method are not significantly different from each other in (a). However, in the case of zero applied rotation rate, shown in (b), the curve for the PCA method is at least a factor of ten higher while the curve for SHEEP remains at about the same level as in FIG. 6(a). FIG. 6(c) shows the mean value of the measured rotation rate. The half-lengths of the error bar attached to each point are the value of the Allan deviation at one second. To guide to eye, in FIG. 6(c) we show the applied rotation rate itself with a dot-dashed line. In the multiple-fringe regime, both the SHEEP and PCA methods return similar mean values and Allan deviations at one second. In the partial-fringe regime, the mean values of the PCA method deviate from the dot-dashed line and have larger Allan deviations. At zero applied rotation rate, the mean value of SHEEP is not exactly zero, due to the non-zero phase gradient offset.

Regarding measurable range of rotation rates, in light-pulse atom interferometry, the rotation of the laboratory frame causes $\vec{k}_{eff}$ to rotate such that atoms receive momentum kicks in slightly different directions from the sequential laser pulses, with the result that atomic spatial wavefunctions at the output of the interferometer do not completely overlap. This walk-off reduces the interferometer contrast at high rotation rates and sets a fundamental upper limit for the maximum rotation rate that can be measured. In our compact instrument, the finite-sized initial cloud and the small expansion factor also reduce the contrast of the spatial fringe pattern as the rotation rate increases, which also sets an upper limit on the measurable rotation rate. In FIG. 4, the highest rotation rate of 5.1 deg/s is not limited by the walk-off or reduced fringe contrast but simply by the upper limit of our ability to simulate rotation through the angular motion of the retroreflecting mirror. The lowest rotation rate of 0.045 deg/s is limited by the electronic noise of the piezoelectric actuator electronics in the retroreflecting mirror.

The upper and lower limits on the measurable rotation rate also depend on technical factors such as the resolution of the analog-to-digital converter in the camera, the pixel size, the camera noise, and the system vibration noise. SHEEP only works when phase noise from vibrations is significantly less than $2\pi$. Our experimental setup is built on a floating optical table without active vibration isolation. The phase instability due to vibration is about 62 mrad at one second when $T_R$=8 ms. We use a relatively short Raman interrogation time $T_R$=7.8 ms to avoid the effects of vibration. This short $T_R$ is also compatible with the dimensions of the glass cell used in the experimental setup.

Regarding unambiguous rotation measurement, in conventional atom interferometers, the rotation is measured from the rotation phase, which is typically derived from the population ratio via an inverse sinusoidal function. However, the inverse sine is ambiguous to an integer multiple of $2\pi$, and therefore the measurement does not provide a unique value of the underlying rotation.

In contrast, PSI gives a unique value of the rotation. The interferometer rotation phase depends linearly on the atom velocity v as $\phi_\Omega = 2\vec{k}_{eff} \cdot (\vec{\Omega} \times \vec{v}) T_R^2$, so the magnitude of the rotation depends on the quantity $d\phi_\Omega/dv = 2k_{eff} T_R^2 \Omega$. The quantity $d\phi_\Omega/dv$ is inherently measured in PSI as a spatial phase gradient across the cold-atom cloud because of the position-velocity correlation of an expanding cloud. The spatial phase gradient is a one-to-one function of the rotation vector projected onto the image plane.

Regarding bandwidth, the phase map can be extracted from three images. The use of four images here allows for Eq. (3) to be symmetric, which reduces some systematics related to the data collection. Because N>1 images are required, the bandwidth of the sensor is reduced by a factor N over single-image approaches. SHEEP is compatible with a queue operation, in which for every new reading, the oldest image in the queue is deleted and a new image is appended at the end of the queue. While this does not increase the sensor bandwidth, it does provide a more continuous readout of the rotation rate, which may be advantageous for some applications.

In light of the rotation dynamic range, unambiguity, and robustness provided by SHEEP, a PSI instrument may be operated in a free-running mode that returns rotation readings for inertial navigation applications. A PSI instrument may also be operated in a zero-fringe locking, closed-loop mode that provides a rotation-free environment for another instrument. In the closed-loop mode, real-time phase maps generated by SHEEP are used as a servo input to an actuator that cancels the platform's rotation. In high-precision atom interferometer gravimeters, sources that generate spatial variation in the population distribution in the final cloud, such as the Earth's rotation, the rotation of a moving platform, or the Raman laser wavefront, can cause systematic errors in the acceleration measurement. SHEEP, combined with additional tools, may be used to characterize those spatially-dependent systematic effects in situ.

SHEEP is advantageous for portable applications, especially in the case of short $T_R$ combined with high bandwidth. The rotation phase gradient has a linear dependence on $T_R$. The vibration phase grows like a quadratic function of $T_R$. Reducing $T_R$ not only increases the bandwidth but also reduces the vibration phase in a way that favors the rotation measurement. As a consequence of lowering $T_R$, there will be fewer fringes in the images; however, SHEEP works for images with any number of fringes, including a fraction of a fringe.

SHEEP extracts the phase map of a point-source atom interferometer from four fringe images with a pixel-by-pixel analysis. SHEEP is more robust in the partial-fringe regime (slow rotations) than PCA. SHEEP does not require prior knowledge of the fringe phase, fringe contrast, or the range of the rotation rate. These advantages benefit the design, data acquisition, and analysis procedures in fieldable applications, as they considerably simplify the decision tree in instruments.

Figure 7:
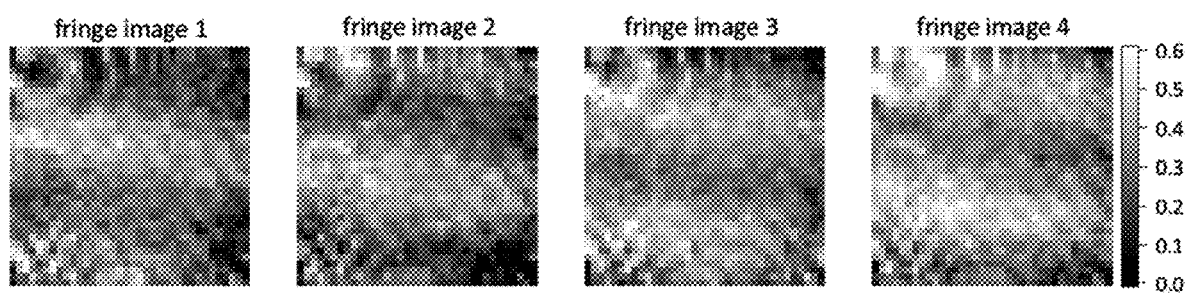
FIG. 7 shows fringe images that are plotted as the population ratio of the F=2 state. The imaging plane is perpendicular to the direction of the Raman laser beams. The fringe phases are 0, $\pi/2$, $\pi$, and $3\pi/2$ relative to the unknown acceleration and Raman laser phase. All images have 36-36 pixels and a physical size of $1.9 \times 1.9$ mm$^2$. There are clearly structures in the normalized population ratio image from imperfections in the imaging process. However, extracting inertial parameters provides a phase map free from most of the structure in the normalized population ratio images through common mode noise cancellation.

FIG. 7 shows a set of four experimental fringe images with an applied rotation rate of 5.1 deg/s, which is the highest rotation rate studied in this work. The 2D fit function uses a trust-region-reflective algorithm.

Figure 8:
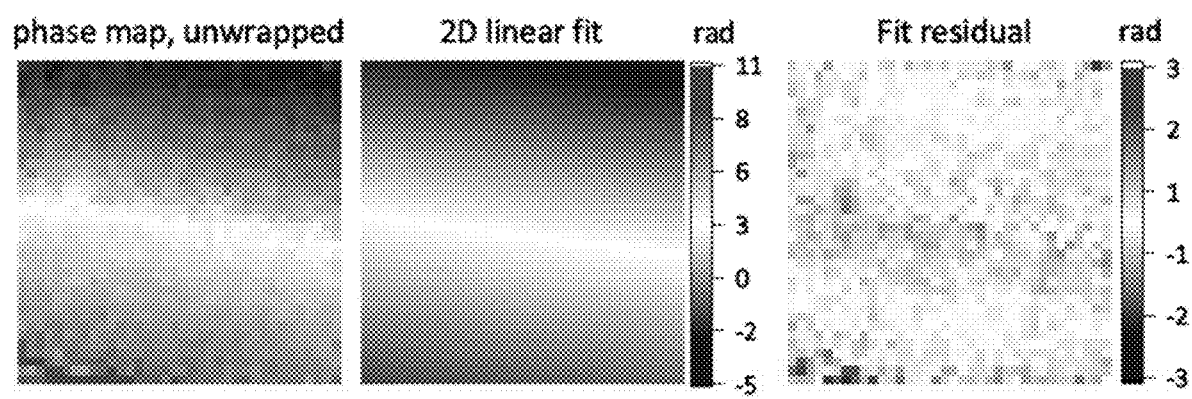
FIG. 8 shows images for extracting inertial parameters, wherein (left panel) a phase map is derived from the fringe images with an inverse tangent function output unwrapped. The middle panel shows a 2D linear fitting to the phase map. The right panel shows a fit residual. All images have 36×36 pixels and a physical size of $1.9 \times 1.9$ mm$^2$.
Figure 9:
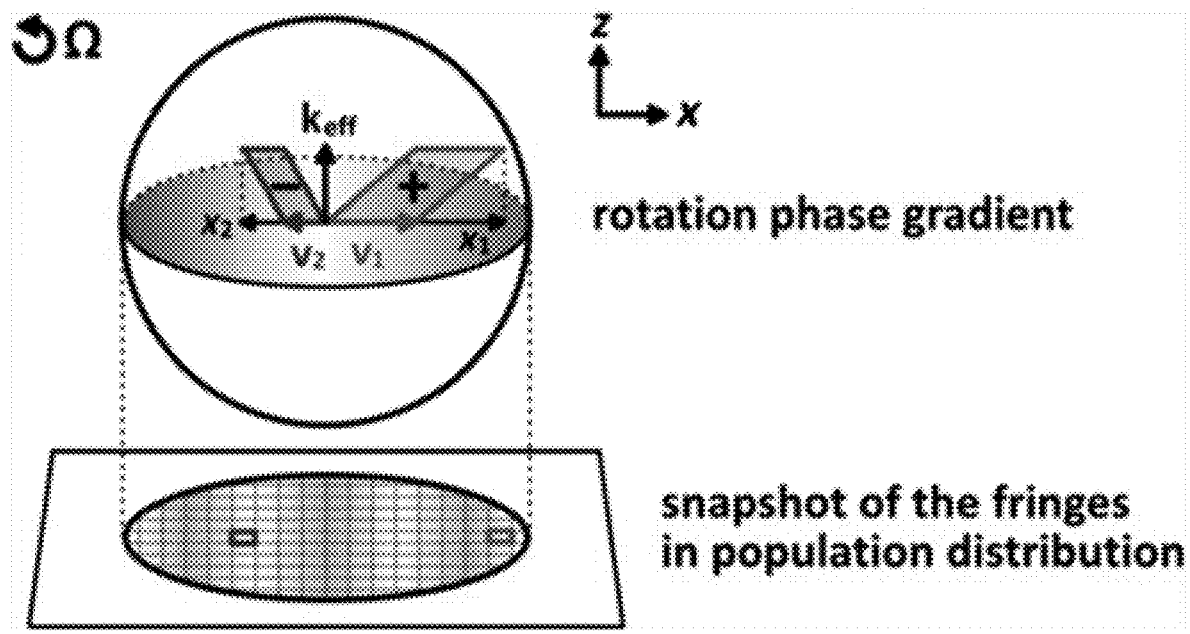
FIG. 9 shows parallel operation of many Mach-Zehnder atom interferometers with a cloud of cold atoms expanding inside a pair of counterpropagating Raman-laser beams of relatively large beam diameter, oriented along z. Two of the many atom interferometers are shown, indicated in red and blue. The position-velocity correlation of a point source preserves the interferometer phase shifts, which are read out as an image of spatial fringes in a population distribution.

For SHEEP, we do not perform any pre-processing on the fringe images. We convert a set of four fringe images into a phase map with Eq. (3) and then unwrap the inverse tangent output. We compute a set of initial fitting parameters and corresponding parameter boundaries from a basic initial statistical analysis of the phase map, and then apply a 2D linear fit using the model in Eqs. (4) to the phase map. The phase map converted from the data and the 2D linear fit are shown in FIG. 8. We convert the fit parameters $k_x$ and $k_y$ and corresponding fit errors from each phase map into a measured rotation rate and the corresponding uncertainty.

Figure 6:
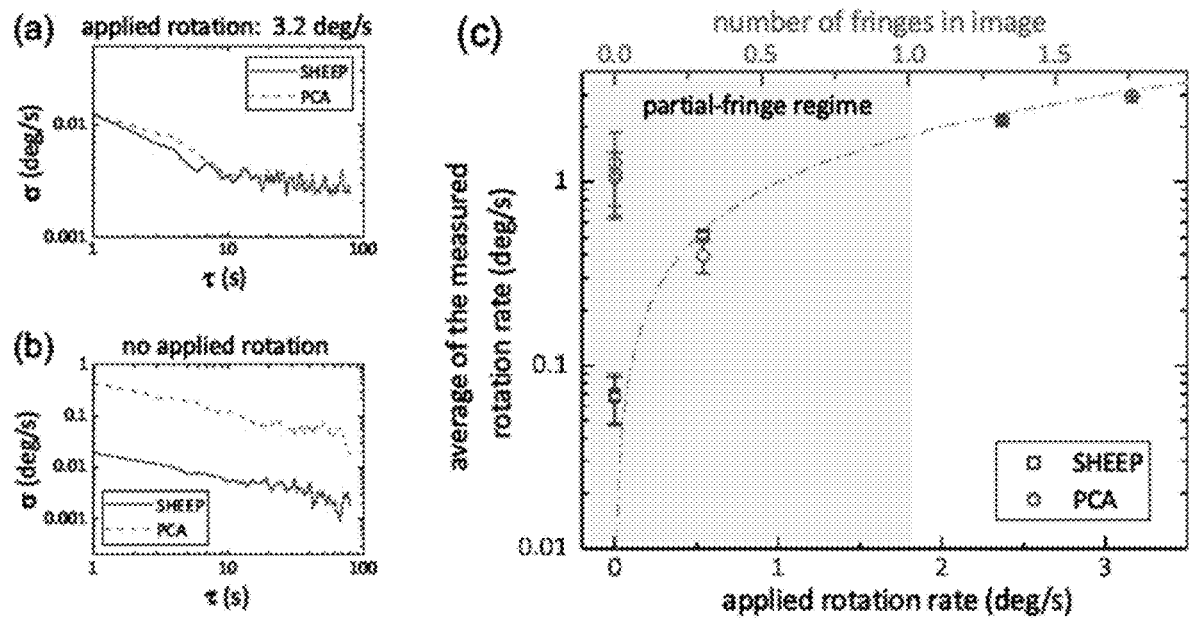
FIG. 6 shows Allan deviation plots of rotation measurements and measured values versus applied rotation rates. (a) and (b) are plots of Allan deviation curves of rotation measurements at an applied rotation rate of 3.2 deg/s and zero applied rotation rate, respectively. Curves were fit from 1 to 10 seconds with the function $A/\tau$-$\sqrt{A}/\tau$, where the fit parameter A is an estimate of the Allan deviation at one second. Measured rotation rates are plotted versus the applied rotation rate in (c). The half-lengths of the error bars equal the respective coefficients A. Note that the right-most data points (squares and circles) are overlapped. The dot-dashed line equals the applied rate (for a scale factor of one). The top horizontal axis shows the number of fringes in the image. The SHEEP method produces a more accurate measurement of the rotation rate with smaller error than PCA at low rotation rates leading to a better assessment of the rotation rate from the data.

The fringe-like structure in the fit residual most likely stems from vibration noise. Vibration causes the phase separation between the images to deviate from $\pi/2$ by random amounts, and thus the conversion from fringe images to the phase map is good. The vibration has no significant effect on the rotation measurement results because in the multiple fringe regime we generally find that SHEEP (which is vibration sensitive) and the PCA method (which is not vibration sensitive) have similar sensitivities and uncertainties. This is seen in FIG. 5 and FIG. 6.

For the comparative PCA method, we first process the same set of four fringe images with PCA. A mean image is generated as the average of all four images. Each image is centered on this mean image by subtracting the mean image. The principal components of the four centered images are calculated. We use the leading two principal components to reconstruct the images without adding the mean image back to the reconstructed images. The background noise is mostly removed in those processed images and the images are ready for 2D sinusoidal fitting.

A 2D sinusoidal fitting function repeatedly fits the same fringe image 50 times using the model in Eq. (5), with newly generated initial fit parameters each time. A uniform random number generator generates initial fit parameters between the upper and lower limits in Table 1. We use the optimized fit parameters from the trial that minimizes the residual. In this way we approximate a global search of parameters. We convert the fit parameters $k_x$ and $k_y$ and fit errors from each fringe image into a measured rotation rate and its uncertainty. We take the average of the rotation rates from the four fringe images and calculate the uncertainty in the typical way of the individual uncertainty divided by the square root of four.

There are some limitations regarding the PCA method used in this work. The PCA method does not return the rotation direction unless additional computation methods are developed for this purpose. The 50 trials of the 2D fitting present only a small sample set of the parameter space; however, further computation effort would be counter-productive for real-time applications.

Example 2. Single-Source Multiaxis Cold-Atom Interferometer in a Centimeter-Scale Cell Using point-source atom interferometry (PSI), we characterize the sensitivity of a multiaxis gyroscope based on free-space Raman interrogation of a single source of cold atoms in a glass vacuum cell. The instrument simultaneously measures the acceleration in the direction of the Raman-laser beams and the projection of the rotation vector onto the plane perpendicular to that direction. The sensitivities for the magnitude and direction of the rotation-vector measurement are 0.033°/s and 0.27° with an averaging time of 1 s, respectively. The fractional acceleration sensitivity $\delta$ g/g is $1.6 \times 10^{-5}/\sqrt{Hz}$. The sensitivity can be increased by increasing the Raman interrogation time, allowing the cold-atom cloud to expand further, correcting the fluctuations in the initial cloud shape, and reducing sources of technical noise. PSI resolves a rotation vector in a plane by measuring a phase gradient. This two-dimensional rotation sensitivity may be specifically important for applications such as tracking the precession of a rotation vector and gyrocompassing.

Light-pulse atom interferometers may help answer some of the most-important questions in fundamental physics because of their extraordinary sensitivity to inertial effects. They may also have applications in navigation and geodesy because of their long-term stability and accuracy. The realization of atom interferometers of small size, low weight, and low power would facilitate their transition from the laboratory to applications in the field. Several groups have demonstrated portable atom-interferometer gravimeters for field use.

Light-pulse-atom-interferometer gyroscopes are typically more complex than gravimeters. Multiple cold-atom sources or a four-pulse Raman geometry are often used to distinguish between interferometer phase shifts induced by rotation and by acceleration. The approach with multiple cold-atom sources has been demonstrated with counterpropagating atomic beams and cold-atom clouds using the most-common beam splitter-mirror-beam splitter Raman pulse sequence. Since the rotational phase shifts depend on the atom velocity while the acceleration phase shifts do not, the rotation and acceleration measurements are constructed from linear combinations of the signals from the counterpropagating cold-atom sources. This approach was successfully implemented in a compact package with a high data rate. The approach with a four-pulse "butterfly" Raman geometry was demonstrated with a single atom cloud. In this configuration, the rotational phase shift depends on the magnitude of the acceleration in the direction orthogonal to the rotation axis and the Raman beams, complicating the extraction of pure rotation in a sensor that is not geostationary. Atom interferometers with the aforementioned three-pulse or four-pulse configuration measure one axis of rotation. Their multiaxis sensitivity can be achieved by interleaving measurements with Raman beams propagating along different axes or with different pulse sequences.

In conventional light-pulse-atom-interferometer techniques, the thermal expansion of the cold-atom cloud is unwanted because it reduces the fringe contrast. In contrast, point-source atom interferometry (PSI) utilizes the thermal expansion of the cold-atom cloud to map the velocity-dependent phase shifts onto an imaging plane. Thermal clouds have also been implemented in guided-wave atom interferometry for inertial sensing. Atoms were prepared in a low-magnetic-field-seeking state and loaded into a magnetic guide, and the manipulation of the matter wave was realized by the scattering of the thermal cloud in the Kapitza-Dirac regime.

Figure 10:
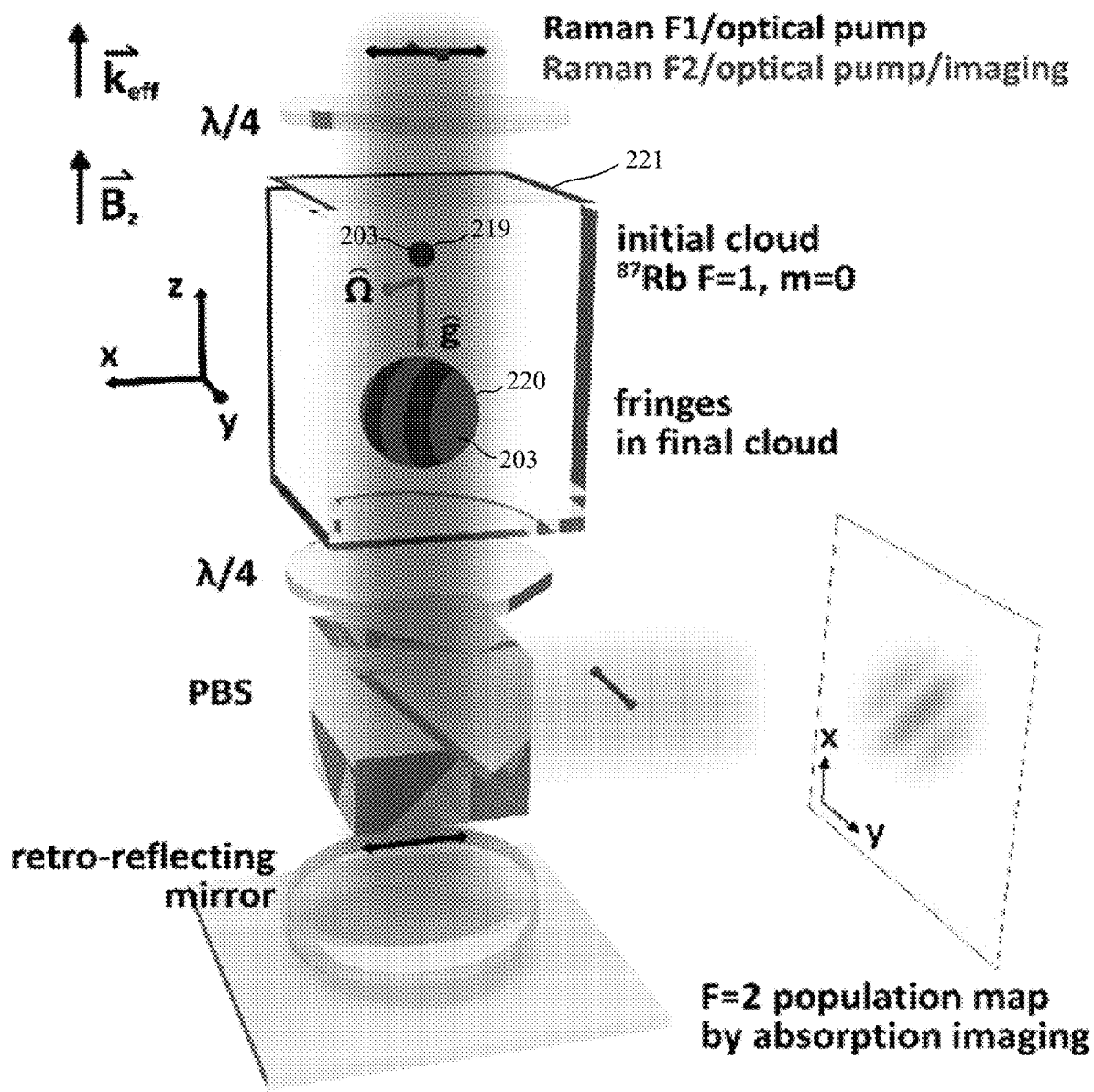
FIG. 10 shows a glass vacuum cell and surrounding optics of an inertial point-source matter-wave atom interferometer gyroscope as a point-source atom interferometer (PSI). The inner dimension of the glass cell was 1 cm$^2$. The inertial point-source matter-wave atom interferometer gyroscope measures acceleration in the z direction and the projection of the rotation vector onto the x-y plane, wherein PBS is a polarizing beam splitter.

PSI is a simultaneous multiaxis-gyroscope technique based on a single source of atoms. PSI was demonstrated in a 10-m atomic fountain designed to enable precision tests of the equivalence principle. In PSI, the beam splitter-mirror-beam splitter Raman pulse sequence is applied to an isotropically expanding cloud of atoms in which each atom interferes only with itself. Because the enclosed area of the matter-wave Mach-Zehnder interferometer depends on the momentum kick applied to the atom and the atom velocity, the thermal velocity spread of the expanding cloud creates many Mach-Zehnder interferometers spanning all directions in a single operation. Each atom acts as an interferometer generating an interferometer phase that depends on the atom's initial velocity, as illustrated in FIG. 10. The strong position-velocity correlation for atoms in the expanded cloud preserves the phase shifts that are detected as an image. Spatial fringes arising from rotations are imprinted on the population distribution between the hyperfine ground states. From the fringe pattern, the acceleration in the propagation direction of the Raman-laser beams and the projection of the rotation vector onto the plane perpendicular to that direction are measured simultaneously.

Taking advantage of the dramatic simplifications provided by PSI, we have developed a process amenable to portable applications in which a single cloud of atoms expands and falls by only a few millimeters during an interrogation cycle. We demonstrated rotation measurements with PSI and characterized a systematic error due to the finite size of the cold-atom cloud. Here, the measurement of acceleration in one direction and the rotation vector in the plane perpendicular to that direction is shown and sensitivity of the rotation-vector measurement is evaluated.

In a ballistically expanding cloud of cold atoms, if the final size of the cloud is much larger than the initial size, referred to as the "point-source approximation," the position of an atom is related to its velocity v and the expansion time $T_{ex}$ of the cloud by $r=vT_{ex}$. In PSI, a beam splitter-mirror-beam splitter ($\pi/2$-$\pi$-$\pi/2$) pulse sequence is applied to the cloud during its expansion. At the time the cloud is detected, the interferometer phase shift from inertial forces is mapped onto space with the leading terms as $$\Phi(r)=k_{eff}\cdot aT^2+k\Omega\cdot r. \quad (1)$$

Wherein the first term is the interferometer phase due to a homogeneous acceleration and the second term is a phase gradient across the cloud due to the rotation of the system. The phase gradient is $k_\Omega=(k_{eff}\times\Omega)2T^2/T_{ex}$, where $k_{eff}$ is the effective Raman transition wavevector, $\Omega$ is the angular velocity of the system, and T is the time between Raman pulses.

Since the population ratio is a sinusoidal function of the interferometer phase, the phase gradient across the cloud induced by rotation leads to fringes in the population distribution. The contributions to the interferometer phase from the rotation components perpendicular to $k_{eff}$ and the acceleration in the direction of $k_{eff}$ are distinguishable because they modify the spatial-fringe pattern in the image plane in distinct and independent ways. The frequency of the fringes is proportional to the magnitude of the rotation projected onto the plane perpendicular to $k_{eff}$. The orientation of the fringes indicates the direction of rotation projected onto that plane. The uniform acceleration translates the fringes spatially without affecting the period or the direction of the fringes because the acceleration shifts the overall phase but does not change the phase gradient.

Figure 11:
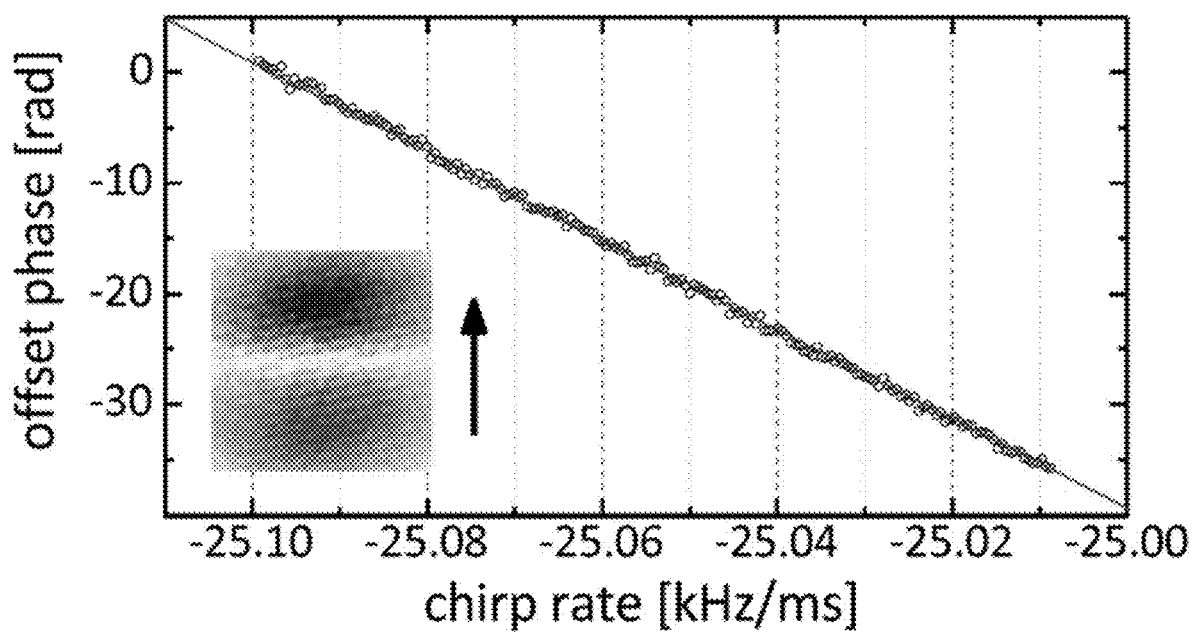
FIG. 11 shows offset phase of the rotation fringes shifting as the acceleration phase is scanned by scanning the Raman-laser chirp rate. The inset of a $2.1 \times 2.1$ mm$^2$ area shows the first fringe image (zero mean, reconstructed) in the data set of 181 images. The arrow indicates the direction of the fringes' travel. A linear fit is shown with fixed slope −402.124 rad ms/kHz. The simulated rotation is 2.02°/s in the +x direction. The average measured rotation rate is 1.60°/s. The experimental repetition rate is 5 Hz and the duration of the data set is 36 s.

In in FIG. 11, the Raman-laser beams propagate along the z axis and therefore the atoms sense the acceleration in the z direction and the components of rotation in the x-y plane. In the point-source approximation, all atoms with the same velocity components in the x-y plane have the same final (x,y) position and the same Sagnac area and thus the same interferometer phase shift. We image the cold-atom cloud in the x-y plane, which preserves the fringe contrast because signals with the same interferometer phase are integrated along z onto the same pixel in the image.

When the initial cloud size is not a point source, the rotation-fringe contrast and the number of fringes will be lower than that of an ideal point source. A finite-sized cold-atom cloud can be considered as a collection of many point sources. Mathematically, the fringe pattern will be the convolution of this initial cloud shape and the fringe pattern of a point source. As a result of the convolution, fringe contrast is reduced, the number of fringes is lower, and the direction of the fringes is modified by the initial cloud shape. In the special case where the cloud has a Gaussian distribution for both position and velocity, the x and y components of the phase gradient $k_\Omega$ are reduced as $$k'_{\Omega,x}=k_{\Omega,x}(1-\sigma_{0x}^2/\sigma_{fx}^2),$$

$$k'_{\Omega,y}=k_{\Omega,y}(1-\sigma_{0y}^2/\sigma_{fy}^2), \quad (2)$$

wherein $k_{\Omega,x}=-2k_{eff}T^2\Omega_y/T_{ex}$ and $k_{\Omega,y}=2k_{eff}T^2\Omega_x/T_{ex}$ are the x and y components of the phase gradient for a point source, respectively. The expansion time $T_{ex}$ is measured from the time when the cold-atom cloud is released from the magneto-optical trap (MOT) or molasses to the time when it is imaged. The terms $\sigma_{0x}$ and $\sigma_{0y}$ are the standard deviation of the initial Gaussian cloud in the x-y plane, and $\sigma_{fx}$ and $\sigma_{fy}$ are the standard deviations when the cloud is imaged.

Our PSI uses laser-cooled $^{87}$Rb atoms in a glass cell with 1-cm$^2$ cross-section area. A manifold that includes an ion pump, a Rb dispenser, and a vacuum window is connected to the glass cell. FIG. 11 shows an illustration of our compact science package, including only the glass cell and the surrounding optics. In the glass cell, the laser beams for state preparation, Raman interrogation, and detection propagate vertically in a shared beam path with an $e^{-2}$ beam diameter of 8 mm and are circularly polarized inside the glass cell. Three orthogonal and retroreflected beams (not shown in the figure) with $e^{-2}$ diameters of 6 mm form the MOT for $^{87}$Rb. The cooling and repumping laser powers are 5.6 and 1.3 mW in each beam, respectively. The laser system that generates the laser beams for the experiment is shown in FIG. 12.

Each experimental cycle starts with a $^{87}$Rb MOT and optical molasses that prepare a cloud of about $10^7$ atoms. The cloud temperature is about 6 μK, and the standard deviation of the Gaussian initial cloud shape is 0.3 mm. The loading and cooling phases of each cycle are 85% of the total cycle when the experimental repetition rate is 5 Hz (and 70% at 10 Hz). We apply a 0.7-G quantization magnetic field in the z axis for the following state preparation and Raman interrogation stages. The atoms are prepared in the F=1, $m_F$=0 state in three steps with use of the lasers from the vertical beam path. First, a 60-μs pulse of F=2→F'=2 transition light pumps the atoms to the F=1 state. Second, a 30-μs pulse of retroreflected $\sigma^+$- and $\sigma^-$-polarized F=1→F'=0 light pumps the atoms to the $m_F$=0 sublevel. Third, a 40-μs pulse of F=2→F'=3 light removes the atoms left in the F=2 state. The final population in the F=1, $m_F$=0 state is at least 85%.

After state preparation, we apply Raman pulses with T=8 ms and π-pulse time $t_\pi$=4.4 μs. The Raman-laser frequencies are tuned 695.815 MHz below the F'=3 level in the 5P manifold of hyperfine states. The maximum separation of the wave packets is about 94 μm, and the enclosed Sagnac area, calculated with the root-mean-square velocity of the atoms, is about 0.03 mm$^2$. We delay the Raman-laser pulse sequence until 8 ms after the end of the molasses stage so that the desired Doppler-sensitive and magnetically insensitive Raman transitions are well resolved from unwanted Raman transitions (which are excited due to the finite polarization extinction ratio and/or spurious reflections of the Raman beams). The power in each Raman-laser beam is adjusted to minimize the ac Stark shift of the Raman transition frequency. The cold-atom cloud falls about 3 mm in each experimental cycle.

The rotation fringes are imprinted in both $^{87}$Rb hyperfine ground states and the patterns are complementary to each other. Detecting either state is sufficient and the population ratio is not required, but detecting both states would increase the signal-to-noise ratio if the difference in the Gaussian cloud shapes, due to imaging delays or optical pushing, could be balanced. In our case, the initial state of the atoms is F=1, $m_F$=0, and for technical reasons only the atoms transferred to the F=2 state after the Raman pulse sequence are imaged. We take an absorption image of the atoms in the F=2 state with a 5-μs pulse of F=2→F'=3 probe-laser light, pump the atoms to the F=1 non-imaged state with 2 ms of the MOT cooling light, and then take an image of the probe-laser light field. From those two images, the density of the final cloud in the F=2 state integrated along the z axis is calculated. Typically, there are 2×10$^6$ atoms in the F=2 state at detection.

We characterize the PSI gyroscope with simulated rotations by tilting the retroreflecting mirror in FIG. 11 during the Raman interrogation, which is formally equivalent to rotating the entire system. The mirror is mounted on a piezo-actuated platform, whose x and y angular displacements are controlled by analog voltages. The simulated rotation is about 10$^3$ times larger than Earth's rotation and generates about one fringe period across the final cloud.

In our setup, the direction of the Raman-laser beams is in the direction of the local gravity vector g, so the frequency difference between the Raman lasers is chirped to compensate for the Doppler shift due to the free fall of the atoms. With this frequency chirp, the acceleration phase is $(k_{eff}g-2\pi\alpha)T^2$, where $\alpha$ is the chirp rate. As a consequence, scanning the chirp rate $\alpha$ provides a convenient way to scan the acceleration phase.

We detect the rotation-fringe images from the raw absorption images with principal component analysis (PCA). PCA has been widely used in machine learning. In our case, PCA can be considered an imaging analogy of lock-in detection. We scan the acceleration phase by scanning the chirp rate a so that the rotation fringes translate from shot to shot. The PCA algorithm identifies the moving components such as the rotation fringes from the raw images.

To use PCA, we recorded a series of images at different chirp rates. The images are averaged to create a mean image in which the moving fringes are washed out but the envelope of the cold-atom cloud is retained. The mean image is then subtracted from each image to create a set of zero-mean images. These zero-mean images are the input to the PCA algorithm, which returns two main outputs: (i) a set of basis images called "principal components" (PCs) and (ii) the variance for each PC, which is the variance of the projection of each input image onto that PC. Because the rotation fringes move as we scan the acceleration phase, the PCA returns a pair of principal components, PC1 and PC2, that have the same period and orientation as the rotation fringes but are 90° out of phase (sine-like and cosine-like). The linear combination of PC1 and PC2, with their projections onto each raw image varying from frame to frame, recreates the moving fringes: as a result, they have the highest variances of the projections. The other PCs, for example, the thin stripes caused by our imaging system (PC4 and PC5), do not follow the scanning of the acceleration phase; they are relatively static in the images and have smaller variances. In general, features of interest can be enhanced by reconstructing the images using only the PCs with the largest variances when we intentionally perturb the system, such as by scanning the acceleration phase.

We reconstruct the fringe images with only the sine-like and cosine-like PCs and disregard all the other PCs of lower variances. The reconstructed and zero-mean images are two-dimensionally fitted with $n(x,y)=A\exp(-x^2/2\sigma_x^2-y^2/2\sigma_y^2)\cos(k_x x+k_y y+\phi)$, where A, $\sigma_x$, $\sigma_y$, $k_x$, $k_y$, and $\phi$ are fit coefficients. We call $\phi$ the offset phase of the rotation fringes. The components of rotation in the x and y directions are calculated as $\Omega_x=k_y T_{ex}/2k_{eff}T^2$ and $\Omega_y=-k_x T_{ex}/2k_{eff}T^2$. The rotation rate is $\sqrt{(\Omega_x^2+\Omega_y^2)}$ and the rotation direction is $\tan^{-1}(\Omega_y/\Omega_x)$.

One can tell by inspecting the orientation of the fringes that the projection of the rotation vector onto the x-y plane points to 45' with respect to the image axis. However, the fringes induced by clockwise or counterclockwise rotations appear parallel in their respective images. The clockwise and counterclockwise rotations are distinguished by our scanning the acceleration phase and observing in which direction the fringes translate. The rotation fringes propagate like a plane wave traveling in the cold-atom cloud when the acceleration phase increases or decreases. The population ratio varies as $\cos[k_{\Omega \cdot r}-(2\pi T^2)\alpha+\phi_0]$, where $\alpha$ is the Raman-laser chirp rate and $\phi_0$ is the phase due to the Raman lasers and a homogeneous acceleration. Because the phase gradients generated by opposite rotations have opposite sign, the rotation fringes move in opposite directions when we scan the acceleration phase by scanning the chirp rate.

When the rotation is large enough to generate one fringe across the cloud, the translational movement of the rotation fringes gives a measurement of the acceleration. FIG. 13 shows a plot of the offset phase extracted from the two-dimensional fits as a function of the chirp rate. Physically, this chirp rate modulation is accomplished by scanning the frequency chirp rate of a frequency synthesizer that is mixed with the optical Raman lasers' beat note, as shown in FIG. 12. In this plot of the offset atomic fringe phase versus the chirp rate, we fit the data with a line and keep the slope as a fixed parameter with the value of $-2\pi T^2$, where T=8 ms. The sensitivity of the acceleration measurement is calculated from the acceleration-phase fluctuations, $\delta\Phi$, with $\delta g/g=\delta\Phi/(gk_{eff}T^2)$. We interpret the root-mean-square of the residuals of the linear fit as $\delta\Phi$. In FIG. 13, $\delta\Phi$ is 0.369 rad with 0.2 s between data points, corresponding to a fractional acceleration sensitivity $\delta g/g$ of $1.6\times10^{-5}/\sqrt{Hz}$ when T=8 ms. The sensitivity is currently limited by the Raman-laser phase noise and the vibration noise.

The Allan-deviation plots of the magnitude and the direction measurements of the rotation vector in the plane perpendicular to the direction of the Raman laser beams from a data set with a data rate of 1 Hz and duration of 4000 s. For both quantities a decreases as $\tau$-½ from $\tau$=1 s to $\tau$=10 s. The intercept of the $\tau$-½-power-fit lines at $\tau$=1 s gives an estimate of the sensitivity of measuring a rotation vector in the plane perpendicular to the Raman-laser beams: the sensitivity for the rate is 0.033°/s and the sensitivity for the direction is 0.27° for an averaging time of 1 s.

In this data set, the experimental repetition rate is 10 Hz. In every 1 s, we record ten rotation-fringe images as the acceleration phase is scanned by 4 rad over the ten images while the chirp rate is scanned from −25.086 to −25.076 kHz/ms. We process the group of ten images with PCA and reconstruct these images with the sine-like and cosine-like PCs. All images are cropped to 1.8×1.8 mm$^2$ (70×70 pixels). By two-dimensionally fitting each reconstructed image, we obtain ten rotation rates and ten rotation directions. The average of the ten rotation rates (rotation directions) is used;

as a result, we have a list of 4000 rotation rates (rotation directions) with a data rate of 1 Hz as the input for the Allan-deviation calculation.

The rotation measurements are based on the phase gradient in the cold-atom cloud, and since the laser phase noise and vibrations (parallel to $k_{eff}$) create common-mode noise across the cloud that affects only the offset of the phase, the rotation sensitivity should be independent of those contributions to first order. The contributions to the noise in our rotation measurement are still under study. We estimate the contributions from the rotating mirror and the uncorrelated vibration of our floating optical table to be $2\times10^{-3}°$/s and $5\times10^{-5}°$/s for an averaging time of 1 s, respectively. The roll-off in FIG. 12 is likely due to a slow drift in the raw data. This could be produced, for example, through the voltage control of the piezo-actuated platform that simulates the rotation, thermal effects, and/or the fluctuations in the cloud shape and size.

In an example set of measurements, the average of the measured rotation rate is 72% to 92% of the simulated rotation because of the finite size of the initial cloud. The final cloud is 2.2 times bigger than the initial cloud in these measurement and we expect to see $1-\sigma_0^2/\sigma_f^2=0.79$ of the simulated rotation assuming a Gaussian cloud shape. The discrepancy in the measurement could come from the Gaussian-shape approximation, fluctuations in cloud shape and size, and/or correlations between the position and velocity in the initial cloud when it is released from the MOT or molasses. Additional errors may arise from the calibration of the imaging system and the calibration of the simulated rotation.

Wavefront aberration is one of the leading systematic errors in light-pulse atom interferometers. In PSI this systematic error is expected to be larger because (i) the cloud necessarily expands and therefore samples more of the Raman-beam transverse profile and (ii) higher-order anti-symmetric wavefront distortions will cause a phase gradient across the cloud and a corresponding systematic error in rotation. We estimate that the wavefront aberration due to the retroreflecting mirror that is specified for λ/10 flatness could create systematic errors in acceleration and rotation of up to $10^{-4}$ g and 0.07°/s, respectively.

The expansion of a cold-atom cloud smooths the structures that exist inside the cloud when it is released from the MOT and optical molasses. With a sufficiently large expansion factor, the expanding cloud becomes roughly Gaussian and the interferometer approaches the point-source limit. In the case when the expansion time is limited for high-bandwidth applications, we may optimize the cloud temperature so that the cloud expands faster for a given interrogation time, for example, by varying the cooling-laser detuning in the molasses stage. Fluctuations and variations in the initial cloud shape can and do cause noise and systematic shifts, however.

By PSI, we demonstrate multi-axis inertial sensing: acceleration in the direction of the Raman-laser beams and the projection of the rotation vector onto the plane perpendicular to that direction. The sensitivity of our present experiment is primarily constrained by the short Raman interrogation time (T=8 ms), technical noise, the initial size of the cold-atom cloud, and the measurement dead time.

The finite initial size of the cold-atom cloud causes systematic errors in the rotation-vector measurement. In the case where the cloud expands by only a few times, the fluctuations in the cloud shape and size could affect the sensitivity of the rotation measurement. Stabilizing the cloud shape may allow us to control and to minimize such systematic errors. With a Gaussian cloud shape, the cloud width in the direction of the Raman-laser beams does not affect the rotation-vector measurement on the plane perpendicular to that direction; only the cloud shape in the plane does. We could use a one-dimensional optical lattice trap in the direction of the Raman-laser beams to initialize the cloud shape in the transverse direction. The density profile of the cloud released from a lattice trap relies on the profile and intensity of the lattice laser beam, which can be adjusted and feedback controlled.

The PSI instrument may be used very naturally as a gyrocompass. In our experiment, the direction of the Raman-laser beams is parallel to g and the cold-atom cloud is imaged in the plane normal to g; therefore, the atoms sense the projection of the rotation vector onto the plane tangent to the surface of Earth at the sensor location. The projection of Earth's rotation onto this plane points to geographic north. Hence, the direction of the rotation fringes due to Earth's rotation will point to geographic north and the number of the fringes will be proportional to the cosine of the latitude of the sensor location.

The PSI gyroscope is analogous to a mechanical gyroscope made of a spinning rotor. When the rotor spins about the z axis, it senses the projection of torque onto the x-y plane. In PSI, when the direction of the Raman-laser beams is along the z axis, the atoms sense the rotation projected onto the x-y plane. The two-dimensional sensitivity of PSI may have applications in detecting time-varying rotation vectors, which is needed to measure a precession. In a simple case where the rotation vector traces a cone centered about the z axis, the precession can be measured by tracking the rotation component in the x-y plane.

FIG. 12 shows a schematic of our laser system, which provides the laser frequency components shown in FIG. 13. We use two commercially available 780-nm lasers. One is an external-cavity diode laser (ECDL) and the other is a frequency-doubled telecom laser that has a 20-kHz linewidth and output power up to 1 W. The ECDL, which is locked to a $^{87}$Rb saturated absorption line via modulation-transfer spectroscopy, provides the MOT cooling light. The telecom laser, locked to the ECDL via a heterodyne optical-phase-lock loop (OPLL), provides the laser frequency components for all other frequencies in the experiment, including the re-pumper, state-preparation lasers, Raman lasers, and the probe laser. The OPLL allows us to switch the telecom-laser frequency over a range of several hundred megahertz in a few hundred microseconds.

For modulation-transfer spectroscopy, a double-pass acousto-optic modulator (AOM1 in FIG. 12) shifts the pump frequency by +160 MHz, so the Doppler-free spectral lines move by −80 MHz. The ECDL is locked to the redshifted crossover transition of F=2→F'=2,3. The lock signal is generated by our modulating the frequency of the 80-MHz signal applied to AOM1 with a 250-kHz sine wave from the lock-in amplifier. The resulting frequency deviation is close to the half-linewidth of the saturated absorption resonance of $^{87}$Rb. Such a choice maximizes the frequency-to-voltage conversion efficiency of the modulation-transfer spectrometer. Most of the ECDL power goes to another double-pass AOM in a cat's eye configuration (AOM2 in FIG. 12) that shifts the laser frequency close to the cycling transition for use in the MOT. The light is red detuned from the cycling transition by 2.5Γ during the MOT phase and is linearly chirped to 14.4Γ during the molasses phase. The power of the cooling laser is actively stabilized and is linearly ramped down by a factor of 10 during the molasses phase.

A small portion of the ECDL light and the telecom-laser light is combined onto a fast photodiode (PD1 in FIG. 12) that measures the beat note between the two lasers. A digital phase-frequency detector compares the beat frequency with a stable rf reference ($f_{OPLL}$) and generates the OPLL lock signal. The telecom laser is phase-locked to the ECDL at a frequency that is below the lock point of the ECDL by $f_{OPLL}$ (FIG. 13). The range of $f_{OPLL}$ is limited by the maximal operating frequency of the digital phase-frequency detector (close to 1 GHz). The fractional power of the carrier in the beat note is greater than 99.73%, which corresponds to $2.7 \times 10^{-3}$ rad$^2$ in the residual phase fluctuation between the two lasers.

Most of the telecom-laser output is split into two beamlines, which we refer to as the "F1" and "F2" beamlines in FIG. 12. The F1 (F2) beamline is used for transitions starting from the F=1 (F=2) manifold. The F1 beamline contains an electro-optic phase modulator (EOM) that creates sidebands at $\Delta_{HFS}+\Delta_{23}/3=6.924$ GHz, where $\Delta_{HFS}=6.835$ GHz is the ground-state hyperfine-splitting frequency of $^{87}$Rb and $\Delta_{23}=266.650$ MHz is the difference between the F'=2 and F'=3 levels in the 5P states. The carrier is nulled by our tuning the rf power applied to the EOM. The F2 beam and the +1 sideband form the Raman beams. The combinations among the other sidebands and the F2 beam are off-resonant by multiples of $\Delta_{23}/3$.

Although both Raman beams are extracted from the same laser, their phase difference (i.e., the Raman-laser phase) fluctuates because of the physically different F1-beam and F2-beam paths. The frequency of the voltage-controlled oscillator applied to AOM5 in the F1 beamline is feedback-controlled around 88.9 MHz to stabilize the phase difference of the two Raman beams. The dc lock signal is generated by our mixing down the beat note of the Raman beams with the two references: a microwave synthesizer, which drives the EOM and mixer 1, and a direct digital synthesizer that provides the common rf source $\Delta_{23}/3$ to AOM3, AOM4, AOM6, and mixer 2.

The power spectral densities of the major phase-noise sources present in our Raman lasers are measured, including the residual Raman-laser phase noise and the absolute phase noise of the microwave synthesizer used as one of the two rf references in phase locking the Raman-laser beams. The residual Raman-laser phase noise, measured from the beat frequency of the Raman-laser beams when the phase lock is enabled, shows only the Raman-laser phase fluctuation relative to the rf references. The Raman phase noise that affects the atoms is the residual Raman-laser phase noise plus the phase noise of the rf references. However, in the low-frequency range (1-10$^4$ Hz), which affects the interferometer phase the most, the contribution from the synthesizer dominates. Following the approach in Ref., with T=8 ms, $t_x$=4.4 µs, and an experimental repetition rate of 10 Hz, we estimate the instability of the interferometer phase arising from the Raman-laser phase noise (due to the microwave synthesizer) to be 90 mrad at 1 s. The corresponding instability of $\delta g/g$ at 1 s is $8.91 \times 10^{-6}$. In comparison, the phase instability due to the vibration (in the direction of the Raman lasers) of the mirror that retroreflects only the F1 beam is approximately 62 mrad at 1 s. The corresponding instability of $\delta g/g$ at 1 s is $6.14 \times 10^{-6}$. The experiment is mounted on a floating optical table with no active vibration isolation.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A process for extracting inertial parameters, the process comprising:
    subjecting gyroscope atoms in an expanding cold atom cloud formed from a point-source of the gyroscope atoms to modulated light and imprinting a laser phase of the modulated light onto the gyroscope atoms;
    producing matter-wave interference among gyroscope atoms in the expanding cold atom cloud formed from the point-source of the gyroscope atoms in response to subjecting the gyroscope atoms in the expanding cold atom cloud to the modulated light;
    subjecting the gyroscope atoms in the expanding cold atom cloud to imaging light;
    acquiring a plurality of fringe images of the expanding cold atom cloud in response to subjecting the gyroscope atoms in the expanding cold atom cloud to the modulated light and to the imaging light, such that for the plurality of fringe images a subsequent fringe image differs from an immediate prior fringe image by a difference in fringe phase;
    producing the difference in fringe phase by changing the laser phase of the modulated light between acquiring individual fringe images;
    converting the fringe images into an interferometric phase map;

fitting a linear function of a first phase gradient, a second phase gradient, and the laser phase to interferometric phase map to obtain the first rotation phase gradient, the second rotation phase gradient, and the acceleration phase; and converting the first rotation phase gradient, the second rotation phase gradient, and the acceleration phase from the fitting of the linear function to the interferometric phase map into a rotation rate, rotation direction, and an acceleration of an inertial point-source matter-wave atom interferometer gyroscope in which the gyroscope atoms are disposed to extract inertial parameters comprising the rotation rate, rotational direction, and the acceleration.

2. The process of claim 1, further comprising:

disposing vapor atoms in a gyroscope gas cell, the gyroscope gas cell being a rotational frame relative to the vapor atoms;

producing the gyroscope atoms as the point-source by cooling the vapor atoms in the gyroscope gas cell, such that that gyroscope atoms are laser cooled atoms, and the gyroscope gas cell is the rotational frame relative to the gyroscope atoms; and expanding the cloud of gyroscope atoms from the point-source as the expanding cold atom cloud.

3. The process of claim 2, further comprising:

optically pumping the gyroscope atoms to a first sublevel of a ground electronic state of the gyroscope atoms; and subjecting the gyroscope atoms to laser pulses of modulated light applied into the gyroscope gas cell.

4. The process of claim 3, further comprising imaging the gyroscope atoms in the expanding cold atom cloud with state-selective absorption of the imaging light.

5. The process of claim 4, wherein imaging the gyroscope atoms in the expanding cold atom cloud comprises:

performing normalized detection of the expanding cold atom cloud by: acquiring a first image of the gyroscope atoms in a second sublevel of the ground electronic state of the gyroscope atoms, repumping all gyroscope atoms to the second sublevel of the ground electronic state of the gyroscope atoms, and acquiring a second image of the gyroscope atoms in the second sublevel of the ground electronic state.

6. The process of claim 5, wherein acquiring each fringe image comprises taking a ratio of the first image to the second image, such that the fringe image comprises a population ratio of the gyroscope atoms in the second sublevel of the ground electronic state.

7. The process of claim 1, wherein the plurality of fringe images comprises four fringe images, and the four fringe images have different fringe phases.

8. The process of claim 7, wherein the interferometric phase map comprises: a phase offset b due to an acceleration of an inertial frame and the laser phase; a rotation phase gradient due to the rotation of said inertial frame.

9. The process of claim 8, wherein, in acquiring the four fringe images, the fringe phase of each subsequent fringe image acquired differs from the fringe phase of the previous fringe image acquired by $\pi/2$.

10. The process of claim 9, wherein, changing the laser phase comprises stepping a laser chirp rate to produce the difference in fringe phase prior to obtaining each fringe image;

wherein, in converting the fringe images into the interferometric phase map, the linear function comprises an inverse tangent function of the population ratio for the four fringe images.

11. The process of claim 10, wherein stepping the laser chirp rate comprises increasing a laser frequency chirp rate by $\frac{1}{4} T_R^2$.

12. The process of claim 10, wherein, in converting the fringe images into the interferometric phase map, the interferometric phase map $f(x_i, y_j)$ is determined by $$\phi(x_i, y_l) = \tan^{-1}\left[\frac{P_2(x_i, y_j) - P_4(x_i, y_i)}{P_3(x_i, y_j) - P_1(x_i, y_j)}\right] + n\pi,$$

wherein $x_i$, $y_j$ are pixels of the interferometric phase map; and $P_1$, $P_2$, $P_3$, and $P_4$ are respectively population ratios of a first fringe image, a second fringe image, a third fringe image, a fourth fringe image of the plurality of fringe images.

13. The process of claim 12, wherein, in fitting the linear function to the interferometric phase map, the linear function provided by $$f(x,y) = k_x x + k_y y + \phi_0,$$

wherein $f_0$ is the sum of an acceleration phase of the inertial point-source matter-wave atom interferometer gyroscope and the laser phase, and $k_x$ and $k_y$ are components of the rotation phase gradient respectively along axes orthogonal to a propagation direction of the modulated light.

14. The process of claim 13, further comprising converting $k_x$ and $k_y$ from the interferometric phase map into a rotation rate according to $$k_x = -\frac{2k_{eff} T_R^2}{T_{ex}} \Omega_y \text{ and } k_y = \frac{2k_{eff} T_R^2}{T_{ex}} \Omega_x,$$

wherein $k_{eff}$ is an effective wave vector of modulated light, $W_x$ and $W_y$ are components of a rotation vector of the inertial point-source matter-wave atom interferometer gyroscope in a plane orthogonal to the direction of propagation of the modulated light; $T_R$ is time between pulses of the modulated light during producing matter-wave interference among gyroscope atoms in the expanding cold atom cloud, and $T_{ex}$ is a total expansion time of the expanding cold atom cloud.

15. The process of claim 14, wherein, in subjecting the gyroscope atoms in the expanding cold atom cloud to the modulated light, the modulated light comprises a laser pulse sequence comprising: a first laser pulse including a first laser power and first laser pulse width, a second laser pulse including a second laser power and second laser pulse width, and a third laser pulse including a third laser power and third laser pulse width, such that the first laser pulse, the second laser pulse, and the third laser pulse serve as matter-wave beam splitters, mirrors, and beam splitters, respectively.

16. The process of claim 15, further comprising producing a phase control signal; and controlling the laser pulse sequence with the phase control signal.

17. The process of claim 16, wherein the laser pulse sequence comprises a $\pi/2$-$\pi$-$\pi/2$ Raman laser pulse sequence.

18. The process of claim 1, wherein, in changing the laser phase of the modulated light between acquiring individual fringe images, the fringe phase is changed by $\pi/2$.

19. An inertial point-source matter-wave atom interferometer gyroscope comprising:

an analyzer that receives a plurality of fringe images of gyroscope atoms, the fringe images comprising: a first fringe image that comprises a first fringe phase, a second fringe image that comprises a second fringe phase; and a third fringe image that comprises a third fringe phase, a fourth fringe image that comprises a fourth fringe phase, wherein the first fringe phase, the second fringe phase, the third fringe phase, and the fourth fringe phase are different;

a phase mapper of the analyzer that produces a interferometric phase map for the gyroscope atoms from the fringe images of the gyroscope atoms; and a fitter of the analyzer in communication with the phase mapper and that receives the interferometric phase map from the analyzer and determines inertial parameters of the gyroscope atoms from the interferometric phase map, the inertial parameters comprising an acceleration, a rotation direction, and a rotation rate of the inertial point-source matter-wave atom interferometer gyroscope relative to the gyroscope atoms.

20. The inertial point-source matter-wave atom interferometer gyroscope of claim 19, further comprising an imager in communication with the analyzer and that receives a plurality of atom cloud projection, produces the fringe images from the atom cloud projections, and communicates the fringe images to the phase mapper.

21. The inertial point-source matter-wave atom interferometer gyroscope of claim 20, further comprising a gyroscope gas cell in communication with the imager and that receives gyroscope atoms, modulated light, and imaging light, produces each atom cloud projection in response to receipt of the imaging light, and communicates each atom cloud projection to the imager.

22. The inertial point-source matter-wave atom interferometer gyroscope of claim 21, further comprising an imaging light source in communication with the gyroscope gas cell and that produces the imaging light and subjects the gyroscope atoms to the imaging light to produce each atom cloud projection.

23. The inertial point-source matter-wave atom interferometer gyroscope of claim 21, further comprising a modulated light source in communication with the gyroscope gas cell and that produces the modulated light and subjects the gyroscope atoms in the gyroscope gas cell to the modulated light.

24. The inertial point-source matter-wave atom interferometer gyroscope of claim 23, wherein the modulated light comprises a laser pulse sequence comprising: a first laser pulse comprising a first laser pulse including a first laser power and laser pulse width, a second laser pulse including a second laser power and laser pulse width, and a third laser pulse including a third laser power and laser pulse width, such that the first laser pulse, the second laser pulse, and the third laser pulse serve as matter-wave beam splitters, mirrors, and beam splitters, respectively.

25. The process of claim 24, wherein the laser pulse sequence is a $\pi/2$-$\pi$-$\pi/2$ Raman laser pulse sequence.

26. The process of claim 25, wherein the difference of laser phase of the modulated light between acquiring individual fringe images is $\pi/2$.

27. The inertial point-source matter-wave atom interferometer gyroscope of claim 23, further comprising a phase shifter in communication with the modulated light source and that produces a phase control signal and communicates the phase control signal to the modulated light source, such that a phase of the modulated light produced by the modulated light source changes in response to the phase control signal.

* * * * *